US012126703B2

(12) United States Patent
Mahany et al.

(10) Patent No.: US 12,126,703 B2
(45) Date of Patent: Oct. 22, 2024

(54) ETHERCAT DEVICE WITH CLOCK GENERATION MODE AND CLOCK PROPAGATION MODE

(71) Applicant: Microchip Technology Incorporated, Chandler, AZ (US)

(72) Inventors: William Mahany, West Islip, NY (US); Ian Saturley, Warwickshire (GB); Lakshmi Narasimhan, Chennai (IN); Riyas Kattukandan, Kerala (IN); Ramya Kuppusamy, Karnataka (IN); Robert Zakowicz, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 108 days.

(21) Appl. No.: 18/125,820

(22) Filed: Mar. 24, 2023

(65) Prior Publication Data

US 2023/0231937 A1    Jul. 20, 2023

Related U.S. Application Data

(62) Division of application No. 17/030,439, filed on Sep. 24, 2020.

(30) Foreign Application Priority Data

Oct. 30, 2019    (IN) .............................. 201911043952

(51) Int. Cl.
*H04L 69/22*    (2022.01)
*G06F 9/4401*    (2018.01)
(Continued)

(52) U.S. Cl.
CPC ............ *H04L 69/22* (2013.01); *G06F 9/4418* (2013.01); *H04J 3/0658* (2013.01); *H04L 12/10* (2013.01)

(58) Field of Classification Search
CPC ....... H04L 69/22; H04L 12/10; G06F 9/4418; H04J 3/0658
See application file for complete search history.

(56) References Cited

U.S. PATENT DOCUMENTS 5,914,957 A      6/1999 Dean et al. ................... 370/438
7,843,218 B1 *  11/2010 Ramaraju ...... G01R 31/318541
                                                    326/46
(Continued)

FOREIGN PATENT DOCUMENTS

CN          1212540 A       3/1999 ............... B66B 3/00
CN        104348690 A       2/2015 ............. H04L 12/10
(Continued)

OTHER PUBLICATIONS

Partial International Search Report and Invitation to Pay Additional Fees, Application No. PCT/US202/057292, 13 pages, Feb. 11, 2021.

(Continued)

*Primary Examiner* — Samina F Choudhry
(74) *Attorney, Agent, or Firm* — SLAYDEN GRUBERT BEARD PLLC

(57) ABSTRACT

An EtherCAT device with a node for use in an EtherCAT network is disclosed. The EtherCAT device includes: a clock circuit; a clock input to receive an input clock signal; a clock output to send an output clock signal; and control logic. The control logic is to determine whether to operate the Ether-CAT device in a clock generation mode or a clock propagation mode, wherein in the clock generation mode, the clock circuit is to drive an oscillator to generate the input clock signal; and in the clock propagation mode, the clock circuit is to receive the input clock signal from another node in the EtherCAT network. The control logic is further to (Continued)

control the clock circuit to output the output clock signal for a subsequent node in the EtherCAT network based upon the input clock signal.

5 Claims, 17 Drawing Sheets

(51) Int. Cl.
*H04J 3/06* (2006.01)
*H04L 12/10* (2006.01)

(56) References Cited

U.S. PATENT DOCUMENTS

| | | | |
|---|---|---|---|
| 10,156,883 B2 | 12/2018 | Heiling et al. | |
| 2005/0220066 A1 | 10/2005 | Wal et al. | 370/343 |
| 2005/0228630 A1* | 10/2005 | Tseng | G06F 30/33 |
| | | | 703/19 |
| 2005/0254586 A1 | 11/2005 | Kim et al. | 375/242 |
| 2012/0210112 A1 | 8/2012 | Suganami | 713/2 |
| 2012/0257694 A1 | 10/2012 | Balakrishnan | 375/340 |
| 2013/0121346 A1 | 5/2013 | Mitchell et al. | 370/465 |
| 2015/0095537 A1 | 4/2015 | Sengoku | 710/110 |
| 2015/0103831 A1* | 4/2015 | Chandhoke | H04L 49/351 |
| | | | 370/392 |
| 2015/0172220 A1 | 6/2015 | Rahamim et al. | 370/389 |
| 2016/0018252 A1* | 1/2016 | Hanson | G01G 19/024 |
| | | | 73/774 |
| 2017/0108912 A1 | 4/2017 | Li et al. | 713/310 |
| 2018/0284758 A1 | 10/2018 | Cella et al. | |
| 2019/0372566 A1 | 12/2019 | Leyrer et al. | |
| 2021/0034042 A1 | 2/2021 | Lee | |

FOREIGN PATENT DOCUMENTS

| | | | |
|---|---|---|---|
| CN | 105612506 A | 5/2016 | G06F 13/42 |
| CN | 107181475 A * | 9/2017 | H02M 3/07 |
| WO | 2007/118099 A2 | 10/2007 | |

OTHER PUBLICATIONS

International Search Report and Written Opinion, Application No. PCT/US2020/057292, 19 pages, Apr. 1, 2021.
Chinese Office Action, Application No. 202080076317.7, 31 pages, May 13, 2023.
U.S. Final Office Action, U.S. Appl. No. 17/030,439, 10 pages, Aug. 17, 2023.
Chinese Office Action, Application No. 202080076317.7, 11 pages, Sep. 23, 2023.
U.S. Non-Final Office Action, U.S. Appl. No. 18,125/857, 18 pages.

* cited by examiner

ETHERCAT DEVICE WITH CLOCK GENERATION MODE AND CLOCK PROPAGATION MODE

PRIORITY

This application is a divisional application of U.S. patent application Ser. No. 17/030,439, filed on Sep. 24, 2020 with the United States Patent and Trademark Office, which claims priority to Indian Provisional Patent Application No. 201911043952 filed Oct. 30, 2019, the contents of which are hereby incorporated in their entirety.

FIELD OF THE INVENTION

The present disclosure relates to electronic communications and, more particularly, to Ethernet for Control Automation Technology (EtherCAT) controllers.

BACKGROUND

EtherCAT is a real-time Industrial Ethernet technology originally developed by Beckhoff Automation. The EtherCAT protocol is disclosed in the International Electrotechnical Commission (IEC) standard IEC 61158. EtherCAT may be used in various suitable applications such as automation, test, and measurement.

An EtherCAT master node may send a frame that may pass through each other node in the network, such as a slave, auxiliary, or secondary node. Each EtherCAT slave node may read the data addressed to it located in the frame, and insert its own data in the frame as the frame is moving downstream. The frame may be delayed only by hardware propagation delay times. In the event that the last slave node in a segment detects an open port, it sends the message back to the master using Ethernet technology's full duplex feature.

The EtherCAT master node might be the only node within a network segment allowed to generate a new EtherCAT frame. All other nodes may merely forward frames downstream, adding its own data in conjunction. This concept may prevent unpredictable delays.

The EtherCAT master node may use a standard Ethernet Media Access Controller (MAC). This may allow the EtherCAT master node to be implemented on any hardware platform with an available Ethernet port, regardless of which real-time operating system or application software is used. EtherCAT slave nodes may use an EtherCAT slave controller to process frames on the fly. The EtherCAT slave controller may be implemented entirely in hardware, making network performance predictable and independent of the individual slave device implementation. The interface for an EtherCAT master or slave node may include a single Ethernet port.

An EtherCAT node may embed its payload in a standard Ethernet frame. The frame is identified with the identifier (0x88A4) in the EtherType field.

EtherCAT controllers such as MACs or EtherCAT slave controllers may include Direct Memory Access (DMA) controllers to perform data transfer between the device and the network. Each EtherCAT slave node may write its data to a corresponding place in the frame and read the data addressed to it all while the frame is moving through the node. Therefore, a frame that arrives back at the master device is already sorted correctly.

Inventors of embodiments of the present disclosure have discovered that present EtherCAT networks and slave controllers do not support low power modes, remote power management, cable diagnostics, or clock daisy-chaining. In such networks, there are no mechanisms for putting nodes in a low power mode, such as a sleep mode, and then waking such nodes. In particular, such nodes in a lower power mode cannot be woken remotely by other nodes using remote power management. Furthermore, in such networks, there are no mechanisms for diagnosing whether network interference or cable problems have degraded signal performance. Also, in such networks, there are no mechanisms to effectively implement a daisy chain configuration of nodes with respect to a clock signal. Inventors of embodiments of the present disclosure have discovered solutions to one or more of these shortcomings of present EtherCAT implementations.

SUMMARY

Embodiments of the present disclosure include an apparatus. The apparatus may include an EtherCAT device for use in an EtherCAT network. The EtherCAT network may include an EtherCAT master node.

Embodiments of the present disclosure may include an EtherCAT device. The EtherCAT device may include a node for use in an EtherCAT network. The EtherCAT device may include a clock circuit, a clock input configured to receive an input clock signal, a clock output configured to send an output clock signal, and control logic configured to determine whether to operate the EtherCAT device in a clock generation mode or a clock propagation. In the clock generation mode, the clock circuit is configured to drive an oscillator to generate the input clock signal. In the clock propagation mode, the clock circuit may be configured to receive the input clock signal from another node in the EtherCAT network. The control logic may be further configured to control the clock circuit to output the output clock signal for a subsequent node in the EtherCAT network based upon the input clock signal.

Embodiments of the present disclosure include an EtherCAT device. The EtherCAT devices may include a node for use in an EtherCAT network. The EtherCAT device may include a data input port configured to receive a signal representing data. The signal may represent logical value. The EtherCAT device may include a degradation calculation circuit configured to read the data into an array of slices and determine a distance between a position of a slice and a position of a reference slice. The slice may include the data input. The degradation calculation circuit may be further configured to determine an error from the distance, and determine a signal quality index from the error.

Embodiments of the present disclosure include methods performing the described configurated operations of any of the above embodiments.

DETAILED DESCRIPTION

Figure 1A:
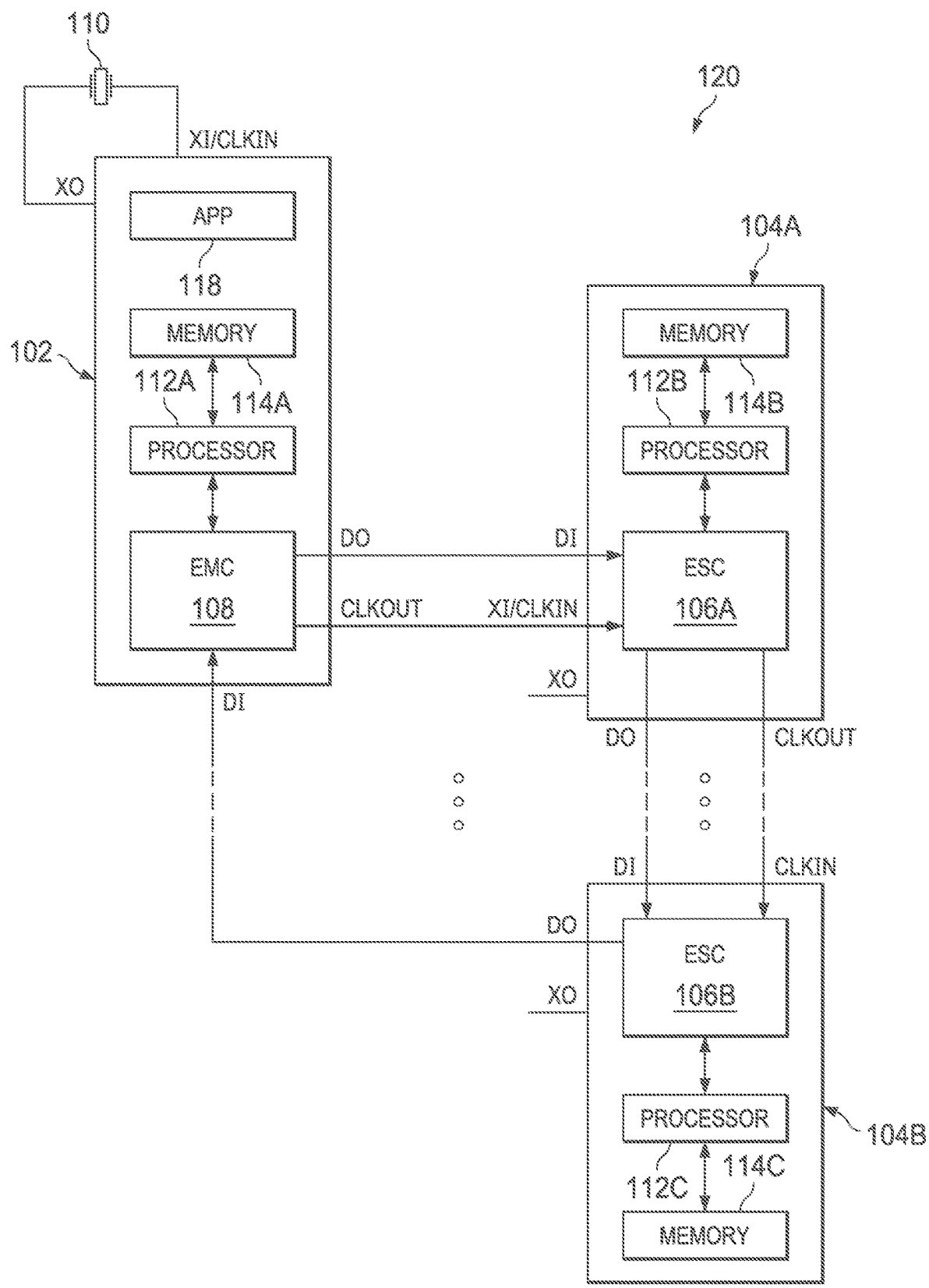
FIGS. 1A and 1B are illustrations of an example network, according to embodiments of the present disclosure.

The EtherCAT devices and EtherCAT master nodes of the following embodiments may be arranged in EtherCAT networks. The circuitry of the EtherCAT devices and EtherCAT master nodes may be implemented in digital logic, analog circuitry, digital circuitry, instructions for execution by a processor, or any suitable combination thereof.

Embodiments of the present disclosure include an apparatus. The apparatus may include an EtherCAT device for use in an EtherCAT network. The EtherCAT network may include an EtherCAT master node. The EtherCAT device may include a communications circuit and a wakeup circuit. The wakeup circuit may be configured to determine a condition for which the EtherCAT device is to send data to the EtherCAT master node. The condition may include, for example, user input, temperature changes, or any other suitable condition. The wakeup circuit may be further configured to, based on the determination of the condition for which the EtherCAT device is to send data to the EtherCAT master node, generate a wakeup packet. The wakeup packet may include a programmed address that is a destination address. The destination address may be specific to wakeup signals. For example, the destination address of the wakeup packet may differ from destination addresses of normal EtherCAT frames, but may yet correspond to the master node. This may be, for example, a predetermined string of values, followed by one or more repetitions of the destination address. The packet may include a broadcast packet or a magic packet. The wakeup circuit may be further configured to send the wakeup packet through a network interface card (NIC) to the EtherCAT network. The communications circuit may be configured to receive an EtherCAT frame from the EtherCAT network. The EtherCAT frame may originate from the EtherCAT master node. The communications circuit may be configured to populate the EtherCAT frame with the data to be sent to the EtherCAT master node. The communications circuit may be configured to send the EtherCAT frame into the EtherCAT network to the EtherCAT master device.

Embodiments of the present disclosure may include an EtherCAT master node of an EtherCAT network. The EtherCAT master node may an EtherCAT master node as described in any of the above embodiments. The EtherCAT master node may include a controller circuit configured to determine whether auxiliary nodes in the EtherCAT network are to be placed in a sleep mode. In a sleep mode, one or more portions of an electronic devices may be powered down, such as removing power or shutting the electronic device off, gating the clock, or operating the electronic device in a manner that reduces power consumption but still provides power.

A sleep mode based on any suitable criteria, input, or condition, such as upon user input, elapse of a period of time with no activity on network 120, elapse of a period of time with no activity for processors 112, or upon demand by master node 102.

The auxiliary nodes may include slave nodes. The controller circuit may be further configured to, based on a determination that the auxiliary nodes are to be placed in the sleep mode, issue a signal with a sleep flag. The sleep flag of the signal may include a value to instruct the auxiliary nodes to enter the sleep mode. The controller circuit may be further configured to, based on a determination that the auxiliary nodes are not to be placed in the sleep mode, issue another signal with a sleep flag. The sleep flag of this other signal may include a value to instruct the auxiliary nodes to not enter the sleep mode. In combination with any of the above embodiments, the sleep flag of the other signal is further to instruct the auxiliary nodes to be woken up from the sleep mode.

Embodiments of the present disclosure may include an EtherCAT device configured to be included in an EtherCAT network. The EtherCAT network may include an EtherCAT master node. The EtherCAT device may include a processor configured to operate in a sleep mode and in a normal operating mode. The EtherCAT device may include a NIC including circuitry configured to receive incoming EtherCAT packets from the EtherCAT network originally issued by the EtherCAT master node. The NIC may further include circuitry configured to, while the processor is in the sleep mode, parse the incoming EtherCAT packets, determine whether a given incoming EtherCAT packet is a wake-on-LAN (WoL) packet, generate a wake signal to the processor based on a determination that the given incoming EtherCAT packet is a WoL packet, and forward the given incoming EtherCAT packet to another node in the EtherCAT network.

In combination with any of the above embodiments, the NIC may include circuitry further configured to determine that the given incoming EtherCAT packet is a WoL packet by a determination that the given incoming EtherCAT packet is a broadcast packet.

In combination with any of the above embodiments, the NIC may include circuitry further configured to determine that the given incoming EtherCAT packet is a WoL packet by a determination that the given incoming EtherCAT packet includes a predetermined value within a payload.

In combination with any of the above embodiments, the NIC may include circuitry further configured to determine that the given incoming EtherCAT packet is a WoL packet by a determination that the given incoming EtherCAT packet includes an address of the EtherCAT device.

In combination with any of the above embodiments, the NIC may include circuitry further configured to determine that the given incoming EtherCAT packet is a WoL packet by a determination that the given incoming EtherCAT packet includes an address of another EtherCAT device.

In combination with any of the above embodiments, the NIC may include circuitry further configured to determine that the given incoming EtherCAT packet is a WoL packet by a determination that the given incoming EtherCAT packet includes an address of the EtherCAT master node.

Embodiments of the present disclosure may include an EtherCAT device. The EtherCAT device may include a node for use in an EtherCAT network. The EtherCAT device may include a clock circuit, a clock input configured to receive an input clock signal, a clock output configured to send an output clock signal, and control logic configured to determine whether to operate the EtherCAT device in a clock generation mode or a clock propagation. In the clock generation mode, the clock circuit is configured to drive an oscillator to generate the input clock signal. In the clock propagation mode, the clock circuit may be configured to receive the input clock signal from another node in the EtherCAT network. The control logic may be further configured to control the clock circuit to output the output clock signal for a subsequent node in the EtherCAT network based upon the input clock signal.

In combination with any of the above embodiments, the clock circuit may include a clock regeneration circuit configured to receive the input clock signal and generate the output clock signal from the input clock signal, the output clock signal configured to alternate between a first voltage level and a second voltage level supplied to the clock regeneration circuit. In combination with any of the above embodiments, the clock circuit may include a first clock regeneration circuit configured to receive the input clock signal and generate a first output. The clock circuit may include a second clock regeneration circuit configured to receive the input clock signal and generate a second output. In combination with any of the above embodiments, the control logic is configured to output the output clock signal based on the first output of the first clock regeneration circuit or the second output of the second clock regeneration circuit based upon whether the EtherCAT device is in the clock propagation mode or clock generation mode.

In combination with any of the above embodiments, the clock circuit may include a crystal driver configured to, in the clock generation mode, provide a signal to the oscillator to drive the oscillator to generate the input clock signal. In combination with any of the above embodiments, the clock circuit, in the clock generation mode, is further configured to route the input clock signal to an input of the crystal driver.

Embodiments of the present disclosure include an EtherCAT device. The EtherCAT devices may include a node for use in an EtherCAT network. The EtherCAT device may include a data input port configured to receive a signal representing data. The signal may represent logical value. The EtherCAT device may include a degradation calculation circuit configured to read the data into an array of slices and determine a distance between a position of a slice and a position of a reference slice. The slice may include the data input. The degradation calculation circuit may be further configured to determine an error from the distance, and determine a signal quality index from the error.

Figure 1B:
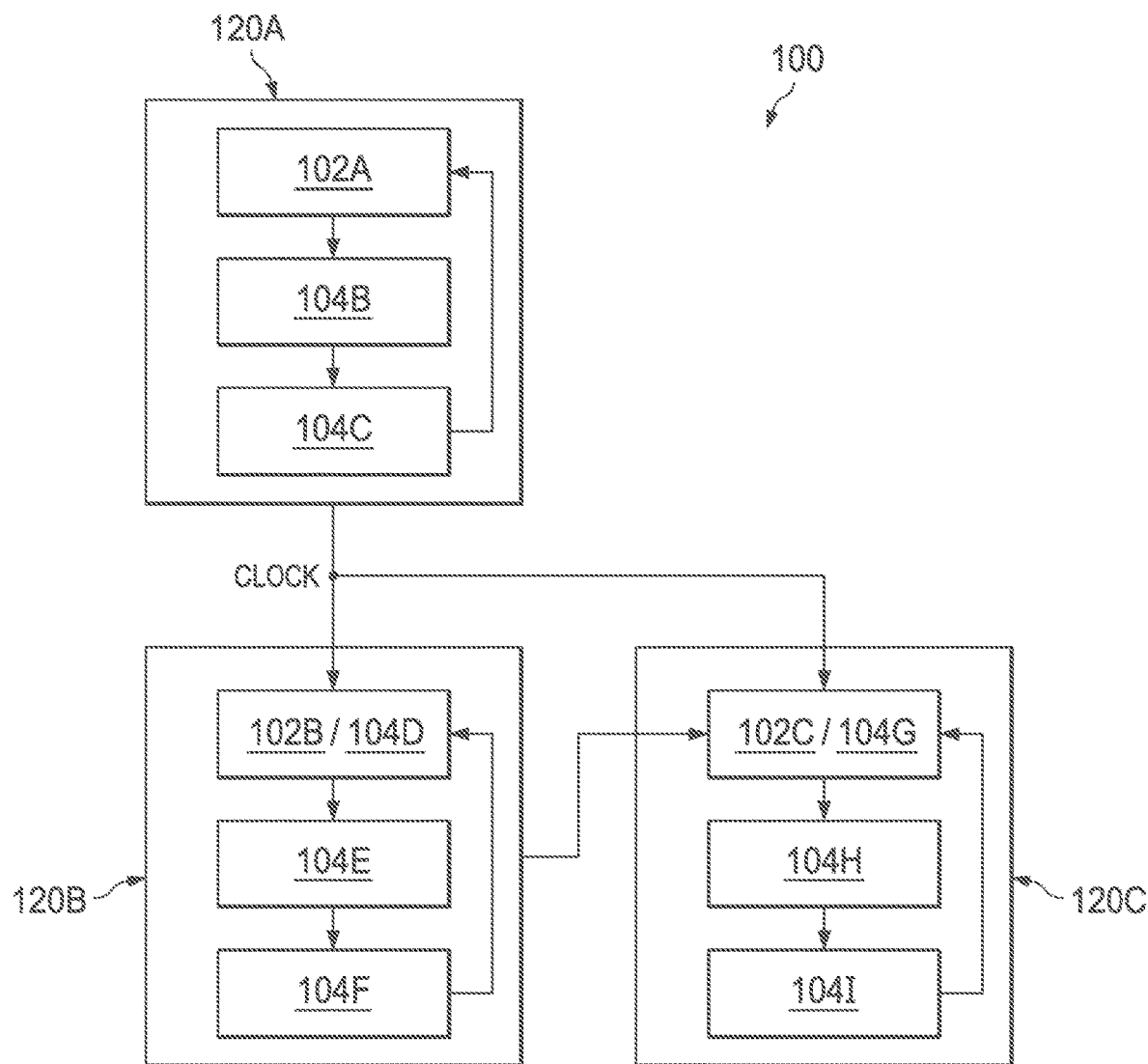

FIGS. 1A and 1B are illustrations of an example network 120, according to embodiments of the present disclosure. Network 120 may be an EtherCAT network. Network 120 may be implemented within any suitable context, such as within a factory, test and validation system, or an automobile or other vehicle. Network 120 may include any suitable and kind of nodes. Each node may be implemented by a computer, laptop, smart sensor, server, controller, microcontroller, or any other suitable electronic device.

For example, network 120 may include one node configured to operate as a master node 102. Network 120 may include one or more other auxiliary nodes configured to operate as slave nodes 104. Although two instances of slave nodes 104 (nodes 104A and 104B) are illustrated in the example of FIG. 1, network 120 may include any suitable number of slave nodes 104.

Master node 102 and slave nodes 104 may be connected in any suitable manner. Master node 102 and slave nodes 104 may be connected using network connections following the EtherCAT protocol as modified by the teachings of the present disclosure. Master node 102 and slave nodes 104 may be connected in a daisy-chain fashion, or in any other suitable topography, for network communication. Data communication ports in master node 102 and slave nodes 104 are represented by data output (DO) and data input (DI) ports. DO and DI ports may be implemented in any suitable manner, such as by PHY Ethernet ports. Although illustrated as a daisy chain configuration in FIG. 1, the representation of the communication between master node 102 and slave nodes 104 as shown in FIG. 1 may be considered logical, and master node 102 and slave nodes 104 may be connected to each other in any suitable physical manner. DI and DO ports may be used to send EtherCAT data between master node 102 and slave nodes 104.

Furthermore, in one embodiment, master node 102 and slave nodes 104 may be connected to each other in a daisy chain manner with respect to a shared clock. Each of master node 102 and slave nodes 104 may include a CLKIN port to receive a clock signal. Each of master node 102 and slave nodes 104 may include a CLKOUT port through which a clock signal may be propagated from the node to another node. For example, master node 102 may include a CLKOUT port that is connected to the CLKIN port of slave node 104A. Slave node 104A may in turn include a CLKOUT port that is connected to the CLKIN port of slave node 104B. The clock signal may be generated by master node 102, as discussed in more detail further below.

Each of master node 102 and slave nodes 104 may include a processor 112 communicatively coupled to a respective memory 114, respectively denoted processor 112A, 112B, 112C and memory 114A, 114B, and 114C. Memory 114 may include instructions that, when loaded and executed by a respective processor 112, may configure the respective node to perform one or more operations as described in the present disclosure.

In one embodiment, master node 102 may include a controller circuit such as an EtherCAT master circuit (EMC) 108. EMC 108 may be implemented in any suitable manner, such as by analog circuitry, digital circuitry, instructions for execution by processor 112A, or any suitable combination thereof. EMC 108 may be configured to control EtherCAT data and clock operations for network 120, such as generating EtherCAT frames, sending frames to slave nodes 104, generating clock signals, sending clock signals to slave nodes 104, waking up slave nodes 104, and receiving and processing wakeup signals from slave nodes 104.

In one embodiment, slave nodes 104 may include an EtherCAT slave circuit (ESC) 106, denoted respectively as ESC 106A, 106B. ESC 106 may be implemented in any suitable manner, such as by analog circuitry, digital circuitry, instructions for execution by processor, or any suitable combination thereof. ESC 106 may be configured to control EtherCAT data and clock operations on behalf of an individual slave node 104, such as reading and parsing signals such as EtherCAT frames, sending signals and EtherCAT frames to other slave nodes 104, receiving clock signals, sending clock signals to others of slave nodes 104, waking up itself upon an internal wake condition, and generating wakeup signals for master node 102.

As discussed above, in one embodiment, a given node in network 120 may include a CLKIN port with which to receive a clock signal from a next node further up the daisy-chain topography. In another embodiment, a given node in network 120 may include a CLKOUT port with which to send a clock signal (whether generated by the device or received through the given node's CLKIN port) to a next node further down the daisy-chain topography. CLKOUT and CLKIN ports may thus be configured to receive a clock signal and forward a clock signal.

Furthermore, in yet another embodiment, a given node in network 120 may include a crystal input (XI) port. The given node in network 120 may include a crystal output (XO) port. The XI and XO ports may be used to connect the given node to an oscillator, crystal, resonant element, or other source for generating a clock signal for the given node. For example, master node 102 may be configured to connect to a crystal 110 through its XO and XI ports. Master node 102 may utilize crystal 110 to generate a clock signal that is then propagated to slave nodes 104 through the CLKOUT port of master node 102.

In one embodiment, if a given node, such as slave nodes 104, is not generating the clock signal, then the XI or XO ports may be unused. In another embodiment, the port for CLKIN and the port for XI may be the same port. The port for XI may be reused as the port for CLKIN, or vice-versa. Thus, in the example of FIG. 1, master node 102 may be connected to crystal 110 through its XO and XI/CLKIN ports. EMC 108 may be configured to obtain a clock signal from crystal 110. EMC 108 may be configured to adjust or divide-down the clock signal received from crystal 110 and provide a resultant clock signal out on its CLKOUT port to slave node 104A. Slave node 104A may be configured to receive the clock signal through its XI/CLKIN port and use the clock signal for synchronous operation with respect to the other elements of network 120. Slave node 104A may be configured to send the clock signal through its CLKOUT port to slave node 104B, while the XO port of slave node 104A is unused or not implemented within slave node 104A. Slave node 104B may be configured to receive the clock signal through its XI/CLKIN port and use the clock signal for synchronous operation with respect to the other elements of network 120. The XO port of slave node 104B may be unused or not implemented within slave node 104B. Slave node 104B may send the clock signal on to other slave nodes (not shown).

Master node 102 may include an application 118 configured to execute on processor 112A. Application 118 may be implemented by any suitable software executing on master node 102. Slave nodes 104 may include analogous applications (not shown). Application 118 may include, for example, firmware, user-level software, automation software, or any other suitable software. Application 118 may have information to be provided to slave nodes 104, or may be able to use information to be provided by slave nodes 104. In order to share or obtain such information, application 118 may utilize communication with slaves 104 through EMC 108. EMC 108 may be configured to receive commands from processor 112A for such communication.

Master node 102 may issue EtherCAT frames to slave nodes 104. The EtherCAT frames may include a request or command for slave nodes to populate data from slave nodes 104 into the EtherCAT frame. This may constitute polling of slave nodes 104 by master node 102. In slave nodes 104, ESC 106 may be configured to monitor for EtherCAT frames from master node 102 or other slave nodes 104 originating from master node 102. In one embodiment, ESC 106 may be configured to monitor for such EtherCAT frames autonomously from processor 112. For example, once ESC 106 is set in a listen mode to monitor for EtherCAT frames, ESC 106 may be configured to monitor DI for EtherCAT frames and output EtherCAT frames through its DO port without requiring additional commands from processor 112. In another embodiment, ESC 106 may be configured to populate data into EtherCAT frames and send these through its DO port without requiring additional commands from processor 112. Such population of data may be performed by memory operations such as DMA operations to memory 114 based upon contents of the received EtherCAT frame instructing slave node 104 to provide particular information. In other cases, ESC 106 may forward the EtherCAT frame to processor 112 and software executing thereon, or other notices to processor 112 and software executing thereon, to provide information for the EtherCAT frame before sending the EtherCAT frame on to other slave nodes 104. In some embodiments, the operation of ESC 106 may be performed in hardware.

EtherCAT frames may be returned from slave nodes 104 at the end of the daisy chain to master node 102. The EtherCAT frame may include information that was requested from slave nodes 104.

Master node 102 and slave nodes 104 may be configured to operate in one or more sleep, power-down, or reduced power or operation modes. In such various sleep modes, one or more portions of the electronic devices may be powered down. In different sleep modes, different portions of the electronic device may be powered down. Powering down the electronic device may include removing power or shutting the electronic device off, gating the clock, or operating the electronic device in a manner that reduces power consumption but still provides power.

Master node 102 and slave nodes 104 may be configured to enter a sleep mode based on any suitable criteria, input, or condition. For example, master node 102 and slave nodes 104 may be configured to enter a sleep mode based upon user input, elapse of a period of time with no activity on network 120, elapse of a period of time with no activity for processors 112, or upon demand by master node 102.

In one embodiment, EMC 108 or ESC 106 may be configured to monitor, in hardware, for wakeup signals to exit a sleep mode. The wakeup signals may be generated by others of EMC 108 or ESC 106 and transmitted over network 120. Upon receiving a wakeup signal, EMC 108 or ESC 106 may be configured to wake respective processors 112, wake other peripherals of the respective node, and forward the wakeup signal to another node on the daisy chain. EMC 108 or ESC 106 may be configured to issue wakeup signals to other nodes on the daisy chain to prepare such nodes to properly receive and process EtherCAT frames.

In one embodiment, EMC 108 and ESC 106 may be configured to determine whether the signal strength of incoming data on its respective DI port is of sufficient strength for proper communication. EMC 108 and ESC 106 may be configured to perform such operations by evaluating the voltage levels of different data as received through the DI port. If the signal strength is of insufficient quality, EMC 108 and ESC 106 may be configured to take any suitable corrective action, such as alerting a user, sending a request to a sender of EtherCAT frames to resend the data, or causing a reset of network 120.

FIG. 1B illustrates example arrangements of nodes within various devices within example networks and within larger networks or systems including such example networks, according to embodiments of the present disclosure. For example, a system 100 may include multiple instances of networks 120.

In one embodiment, a given master node 102 daisy-chained to one or more slave nodes 104 may be located on a single device. This may be represented as a single instance of network 120 in FIG. 1B. A given network 120 in FIG. 1B may be implemented wherein each of its nodes are different components on a same semiconductor die, chip, printed circuit board (PCB), or another platform. System 100, as a system, electronic device, or otherwise an aggregation of smaller networks, may include multiple instances of devices 120, as shown in FIG. 1B. System 100 may itself be considered a network. The nodes within each instance of network 120 may be daisy-chained together with respect to the clock signals.

In one embodiment, the instances of networks 120 may be daisy-chained with respect to the clock signals. In another embodiment, the instances of networks 120 might not be daisy-chained with respect to the clock signals. Within a given instance of networks 120, the nodes therein may be a master node or a slave node.

For example, network 120A may include a master node 102A, which provides a clock signal in daisy chain fashion to subsequent slave nodes 104A and 104B. Data may be returned to master node 102A. This relationship is reflected in FIG. 1A.

Network 120B may include a first node, which may provide a clock signal in daisy chain fashion to subsequent slave nodes 104E and 104F. In one embodiment, the first node may be an instance of a master node, such as master node 102B. In another embodiment, the first node may be an instance of a slave node, such as slave node 104D. In such an embodiment, although slave node 104D might not be considered to be fully implemented as a master node, slave node 104D might still provide a clock signal in daisy chain fashion to other slave nodes 104E and 104F in the same way that a master node would provide the clock signal.

Similarly, network 120C may include a first node, which may provide a clock signal in daisy chain fashion to subsequent slave nodes 104H and 104I. In one embodiment, the first node may be an instance of a master node, such as master node 102C. In another embodiment, the first node may be an instance of a slave node, such as slave node 104G. In such an embodiment, although slave node 104G might not be considered to be fully implemented as a master node, slave node 104G might still provide a clock signal in daisy chain fashion to other slave nodes 104H and 104I in the same way that a master node would provide the clock signal.

In one embodiment, each instance of networks 120B and 120C may generate its own clock signal and propagate the clock signal amongst its nodes. In another embodiment, each instance of networks 120B and 120C may receive a clock signal and propagate that clock signal amongst its nodes. In a further embodiment, networks 120B and 120C may receive the clock signal in parallel from network 120A. In another, further embodiment, networks 120B and 120C may receive the clock signal in a daisy chain manner from network 120A.

For example, network 120B may receive a clock signal from network 120A. In one embodiment, the clock signal may include the clock signal sourced in master node 102A, provided in parallel to slave node 104B and to network 120B. In another embodiment, the clock signal may include the clock signal from the end of the daisy chain of network 120A, such as by slave node 104C.

In another example, network 120C may receive a clock signal from network 120A. In one embodiment, the clock signal may include the clock signal sourced in master node 102A, provided in parallel to slave node 104B and to network 120C.

In yet another example, network 120C may receive a clock signal from network 120B. In one embodiment, the clock signal may include the clock signal from the end of the daisy chain of network 120B, such as by slave node 104F.

In various embodiments, each instance of network 120 may generate its own clock, access a clock of network 100 in parallel, or otherwise source a clock signal without reference to the other instances of network 120. Furthermore, in various embodiments the instances of network 120, when daisy-chained together, may operate in a manner similar to the interior components of a single instance of network 120 with respect to master node and slave node sharing of a clock signal.

Figure 2:
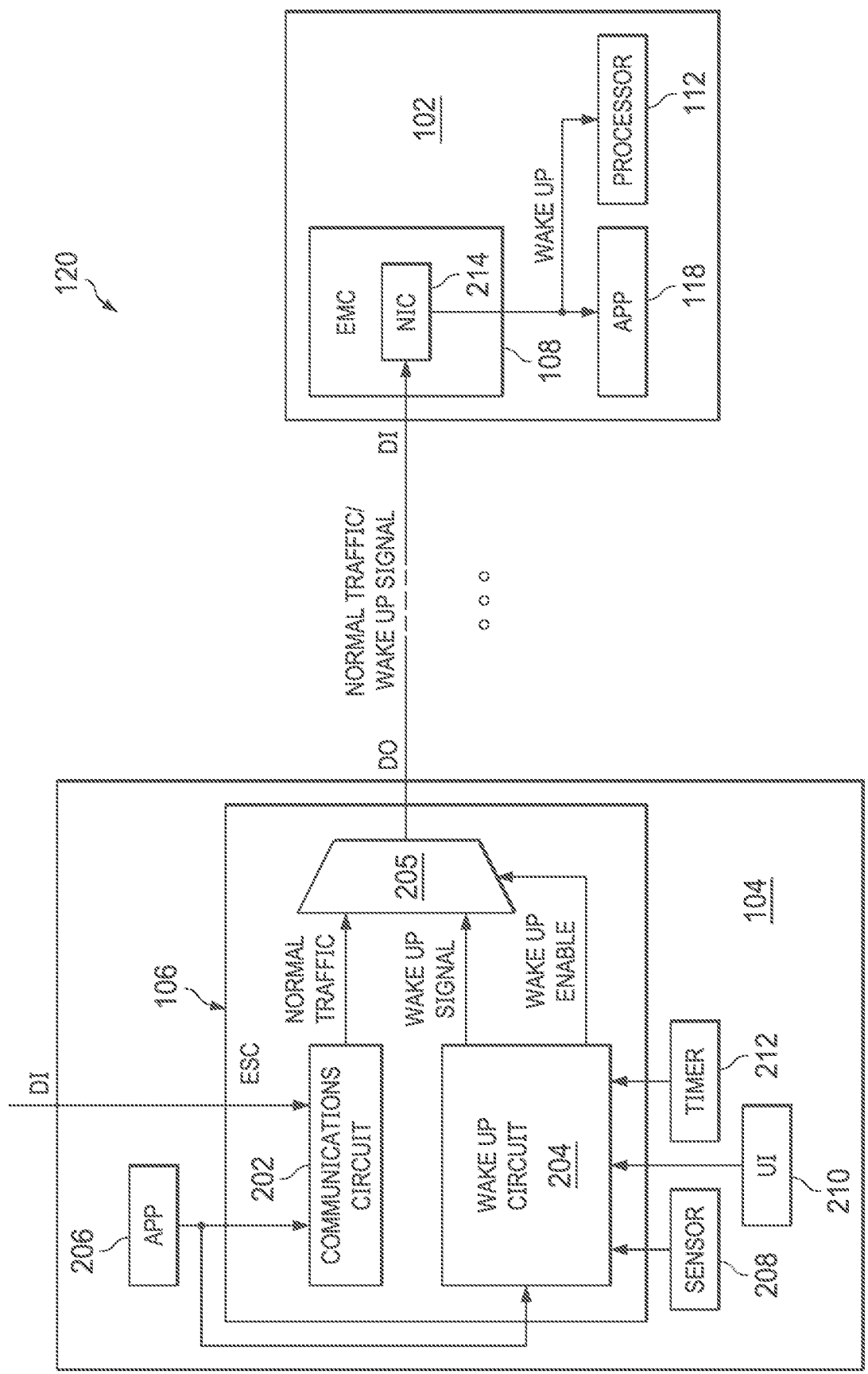
FIG. 2 is a more detailed illustration of the network, including portions of the slave node configured to wake a master node, according to embodiments of the present disclosure.

FIG. 2 is a more detailed illustration of network 120, including portions of slave node 104 configured to wake master node 102, according to embodiments of the present disclosure.

As discussed above, master node 102 may include application 118. Application 118 may be configured to stop network traffic on network 120. Such a stoppage may be based on, for example, expiration of a timer without new traffic, user input, or any other suitable input or condition. Master node 102 may be placed in sleep mode through any such input or condition.

While master node 102 is in sleep mode, one or more components of master node 102 may be configured to monitor for wakeup signals. Such wakeup signals may originate from, for example, a user of master node 102, from components within master node 102, or from slave nodes 104, as shown in FIG. 2. For example, EMC 108 may include a network interface card (NIC) 214 configured to monitor for wakeup signals received from slave nodes 104.

Slave node 104 in turn may be in normal operating mode or in a sleep mode. Slave node 104 may be in a sleep mode wherein portions therein are shut off except for components to monitor for wake conditions. Such conditions may include, for example, user input, temperature changes, or any other suitable condition. Whether slave nodes 104 are in a normal operating mode or in a sleep mode, a given one of slave nodes 104 may determine that a condition has arisen for which network 120 should be awake. Slave nodes 104 might not be able to create or generate a new EtherCAT frame, and such a capability might be reserved to master node 102. However, master node 102 may be in a sleep mode. Thus, in one embodiment slave node 104 may be configured to wake master node 102 so that master node 102 will begin polling again, or issuing a new EtherCAT frame. The EtherCAT frame, when received by the slave node 104 that woke master node 102, may be populated by the slave node 104 with the information that caused slave node 104 to wake master node 102.

In order to wake master node 102, and based upon a determination of a condition for which slave node 104 is to send data to master node 102, any suitable signal may be generated by slave node 104. The signal may include a wakeup packet including a destination address matching an address programmed in NIC 214. The destination address may be specific to wakeup signals. For example, the destination address of the wakeup signal may differ from destination addresses of normal EtherCAT frames, but may yet correspond to master node 102. NIC 214, through such a specific destination address, may distinguish between wakeup signals and normal traffic. The signal may include a magic packet as used in Ethernet networks. The magic packet may be a broadcast frame including a payload with a designated string of values. This may be, for example, a predetermined string of values, followed by one or more repetitions of the destination address. The signal may include a broadcast packet, wherein NIC 214 wakes upon the nature of the signal being a broadcast packet, as opposed to a packet intended for a specific destination.

Slave node 104 may include any suitable mechanism for generating a wakeup signal. Moreover, slave node 104 may include any suitable mechanism for generating normal traffic. For example, slave node 104 may include a wakeup circuit such as wakeup circuit 204. Slave node 104 may include a communications circuit such as communications circuit 202. Wakeup circuit 204 and communications circuit 202 may be implemented within, for example, ESC 106. Wakeup circuit 204 and communications circuit 202 may be implemented by analog circuitry, digital circuitry, instructions for execution by a processor, or any suitable combination thereof. Wakeup circuit 204 may be configured to determine a condition for which slave node 104 is to send data to other nodes, such as master node 102. For example, wakeup circuit 204 may be configured to determine wakeup conditions for slave node 104 and network 120. To determine a wakeup condition, wakeup circuit 204 may receive input from any suitable source that slave node 104 is to wake up, or that conditions exist for which slave node 104 is to report data, alerts, or information to other parts of network 120. For example, slave node 104 may include, or may be communicatively coupled to, a sensor 208, a user interface (UI) 210, or a timer 212. Sensor 208 may record a network, device, or environmental condition for which other elements of network 120 are to be informed. UI 210 may record user input to wake, explicitly or implicitly, portions of network 120. Timer 212 may alert wakeup circuit 204 that portions of network 120 are to be woken based on, for example, a periodic basis.

Communications circuit 202 may be configured to issue normal traffic, such as population of EtherCAT frames, on behalf of slave node 104. For example, upon receipt of an EtherCAT frame on DI, an application 206 of slave node 104 may provide input to populate the EtherCAT frame. Such a populated EtherCAT frame may be issued as normal traffic through DO of slave node 104.

Slave node 104 may include any suitable mechanism for determining whether to issue normal traffic or wakeup signals. For example, slave node 104 may include a multiplexer 205 configured to selectively issue output of normal traffic from communications circuit 202 or to issue wakeup signals from wakeup circuit 204. Multiplexer 205 may be controlled by, for example, wakeup circuit 204. Wakeup circuit 204 may be configured to issue a wakeup enable signal to multiplexer 205. The wakeup enable signal, when set to an active level, may cause multiplexer 205 to issue output from wakeup circuit 204. Otherwise, and by default, multiplexer 205 may issue output from communications circuit 202.

Master node 102 may be configured to receive wakeup signals or normal traffic from slave nodes 104 through DI. Normal traffic received at master node 102 while master node 102 is in a sleep mode may be ignored. A wakeup signal received at master node 102 while master node 102 is in a normal operation mode may be ignored.

Upon receipt of a wakeup signal, master node 102 may be configured to generate new EtherCAT frames to poll slave nodes 104. In order to generate new EtherCAT frames, various portions of master node 102 may be woken from a sleep mode. For example, upon detection of the wakeup signal from slave nodes 104, NIC 214 may generate an interrupt or other suitable wakeup signal to application 118 or processor 112. Thereafter, master node 102 may be configured to generate an EtherCAT frame and send the EtherCAT frame to slave nodes 104.

Thereafter, communications circuit 202 may be configured to receive the EtherCAT frame originating from the now-woken master node 102 on DI. Communications circuit 202 may be configured to populate the EtherCAT frame with the data to be sent to master node 102. The data may include data requested by master node 102 through the EtherCAT frame, data recorded by slave node 104, alerts, or any other suitable information. Communications circuit 202 may be configured to then send the populated EtherCAT frame through network 120 back to master node 102.

In one embodiment, slave node 104 may be configured to issue a wakeup signal upon any condition in which slave node 104 determines that slave node 104 is to share information with other elements of network 120.

Figure 3:
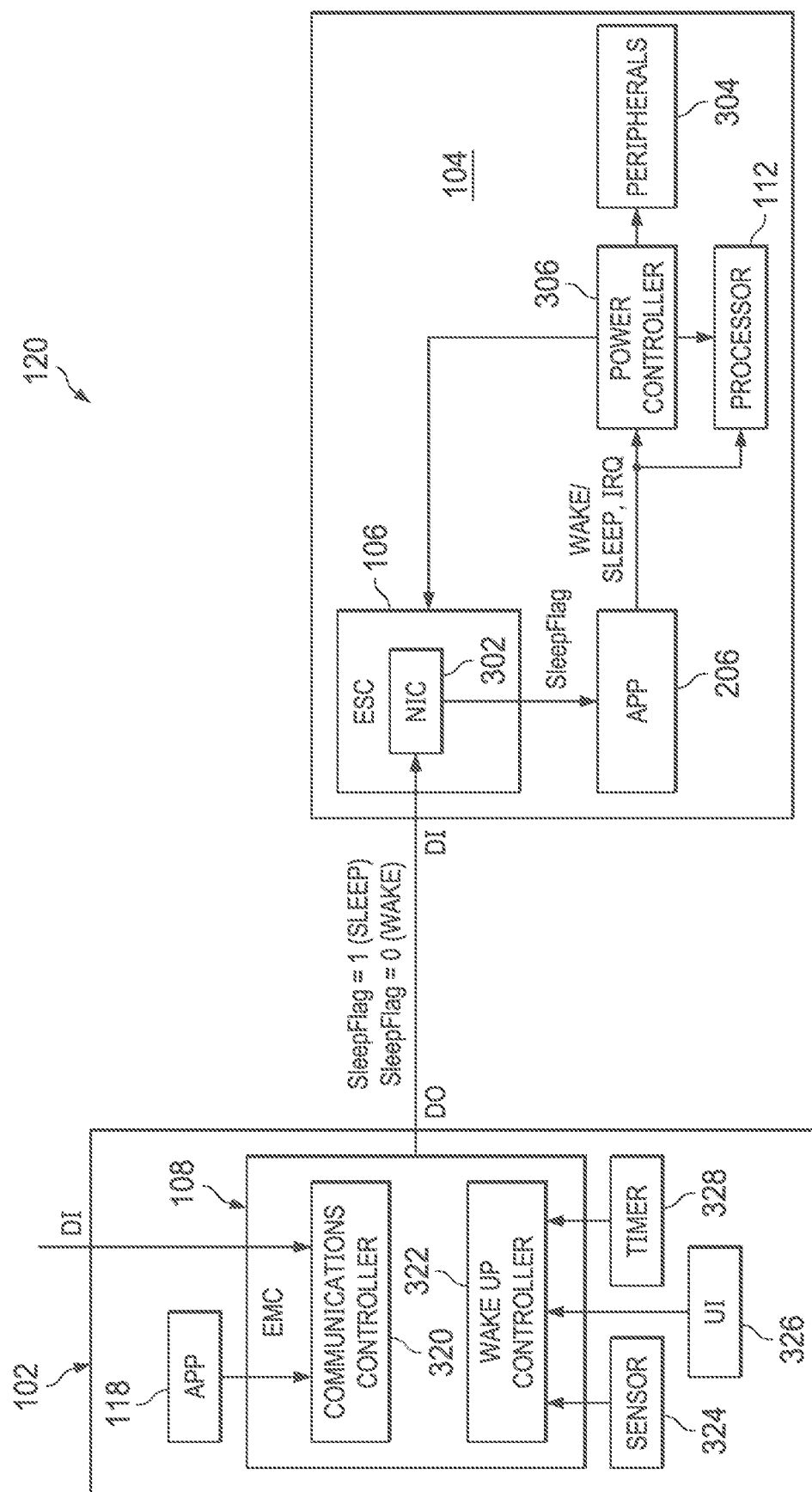
FIG. 3 is a more detailed illustration of the network, including portions of the master node configured to wake the slave node using flags in network traffic, according to embodiments of the present disclosure.

FIG. 3 is a more detailed illustration of network 120, including portions of master node 102 configured to wake slave node 104 using flags in network traffic, according to embodiments of the present disclosure.

Master node 102 may be configured to wake slave nodes 104 in order to ensure that slave nodes 104 are able to receive and process EtherCAT frames. Master node 102 may be configured to wake itself or determine whether to wake slave nodes.

As discussed above, master node 102 may be configured to stop network traffic on network 120. Such a stoppage may be based on, for example, expiration of a timer without new traffic, user input, or any other suitable input or condition. Master node 102 may be placed in sleep mode through any such input or condition. Moreover, master node 102 may be configured to put slave nodes 104 in sleep mode based on any such input or condition.

While slave node 104 is in sleep mode, one or more components of slave node 104 may be configured to monitor for wakeup signals. Such wakeup signals may originate from, for example, a user of slave node 104, from components within slave node 104, or from master node 102, as shown in FIG. 3. For example, ESC 106 may include a NIC 302 configured to monitor for wakeup signals received from master node 102. NIC 302 may be further configured to monitor for incoming EtherCAT packets from network 120 originally issued by master node 102.

Master node 102 in turn may be in normal operating mode or in a sleep mode. Master node 102 may be in a sleep mode wherein portions therein are shut off except for components to monitor for wake conditions. Such conditions may include, for example, user input, temperature changes, or any other suitable condition. Whether master node 102 is in a normal operating mode or in a sleep mode, master node 102 may determine that a condition has arisen for which network 120, and in particular, slave nodes 104, should be awake. Slave nodes 104 might not be able to respond to EtherCAT frames while in sleep mode. Thus, in one embodiment master node 102 may be configured to wake slave nodes 104 so that slave nodes 104 may begin again responding to polling and to received EtherCAT frames.

In order to wake slave nodes 104 or put slave nodes 104 into a sleep mode, any suitable signal may be generated by master node 102. In one embodiment, traffic or packets with a particular flag, such as SleepFlag, may be used to wake slave nodes or put slave nodes 104 into a sleep mode. Such traffic or packets may be implemented in an EtherCAT frame. SleepFlag may include a bit, flag, information, or other data of a packet. If SleepFlag is inactive in a packet sent from master node 102, then a slave node 104 receiving the packet may wake, if it is in a sleep mode. If slave node is in a normal operating mode, then the flag as set as inactive may be ignored. In any case, if SleepFlag is set as inactive, the slave node 104 receiving the packet might not enter or maintain a sleep mode. SleepFlag may be inactive by default. If SleepFlag is active, then a slave node 104 receiving the packet may enter a sleep mode if it is not already in a sleep mode. If the slave node 104 receiving the packet is already in a sleep mode, then the packet may be ignored or simply forwarded. In any case, a slave node 104 receiving traffic with a SleepFlag set either way may also forward the traffic to other slave nodes 104.

Master node 102 may include any suitable mechanism for generating a wakeup signal with SleepFlag set or cleared in a packet. For example, master node 102 may include a wakeup circuit 322 or a communications circuit 320. Wakeup circuit 322 and communications circuit 320 may be implemented within, for example, EMC 108. Wakeup circuit 322 and communications circuit 320 may be implemented by analog circuitry, digital circuitry, instructions for execution by a processor, or any suitable combination thereof. Wakeup circuit 322 may be configured to determine wakeup conditions for master node 102 and network 120. Wakeup circuit 322 may receive input from any suitable source that master node 102 or other elements of network 120 are to wake up. For example, master node 102 may include, or may be communicatively coupled to, a sensor 324, a UI 326, or a timer 328. Sensor 324 may record a network, device, or environmental condition for which network 120, such as master node 102 slave nodes 104 are to wake up and slave nodes 104 are to begin reporting. UI 326 may record user input to wake, explicitly or implicitly, portions of network 120. Timer 328 may alert wakeup circuit 322 that portions of network 120 are to be woken based on, for example, a periodic basis.

EMC 108 may be configured to issue normal traffic with SleepFlag set to inactive using communications circuit 320. For example, application 118 may provide input or commands to populate an EtherCAT frame. Such an EtherCAT frame may be issued as normal traffic after receipt of an EtherCAT frame on DI, or generation of an EtherCAT frame, when slaves 104 are awake. The EtherCAT frame may be issued by communications circuit 320.

Furthermore, upon notification or determination that an EtherCAT frame is to be sent to slaves 104, EMC 108 may be configured to issue a signal with SleepFlag set to inactive to wake slaves 104. This may be performed by wakeup circuit 322.

Upon notification or determination that slaves 104 are to be put into a sleep mode, EMC 108 may be configured to issue a signal with SleepFlag set as active. This may be performed by wakeup circuit 322. The signal may include an EtherCAT frame or any other suitable signal, and may be generated by any suitable portion of EMC 108.

Slave nodes 104 may be configured to receive signals from master node 102 through DI. Slave nodes 104 may be configured to receive a signal from master node 102 including a SleepFlag. If SleepFlag is set as active, and slave node 104 is already in a sleep mode, the SleepFlag may be ignored and the signal propagated to another slave node. If SleepFlag is set as active, and slave node 104 is not in a sleep mode, then slave node 104 may set various portions of slave node 104 to a reduced power mode or off. The signal may be propagated to another slave node. If SleepFlag is set to inactive, and slave node 104 is already awake, the signal may be ignored and the signal propagated to another slave node. If SleepFlag is set to inactive, and slave node 104 is not awake, various portions of slave node 104 may be woken and the signal may be ignored and the signal propagated to another slave node.

Any suitable portion of slave node 104 may handle the wake or sleep operations based upon the status of SleepFlag. For example, NIC 302, upon detecting a status of SleepFlag requiring wake or sleep changes in slave node 104, may pass the status of SleepFlag to application 206, processor 112, or power controller 306. NIC 302 may pass SleepFlag to application 206. NIC 302 may first wake application 206, or application 206 may be operating in a limited manner on portions of slave node 104 that are still operating during the sleep mode. Application 206 may pass wake instructions, sleep instructions, interrupt requests, or any other suitable signal to processor 112 and power controller 306. Power controller 306 may be implemented by analog circuitry, digital circuitry, instructions for execution by a processor, or any suitable combination thereof. Power controller 306 may be configured to wake or put to sleep various peripherals 304 of slave node 104, which may include, for example, memory controllers, video controllers, input/output devices, counters, timers, function generators, encryption blocks, or any other suitable electronic device or portion thereof. Processor 112 may be configured to wake or put to sleep various components therein, such as processing cores. While in sleep mode, some peripherals 304 may stay operational while others of peripherals 304 or processor 112 enter a sleep mode. For example, a motor controller may continue to operate an electromechanical motor without additional input from processor 112 during a sleep mode.

Figure 4:
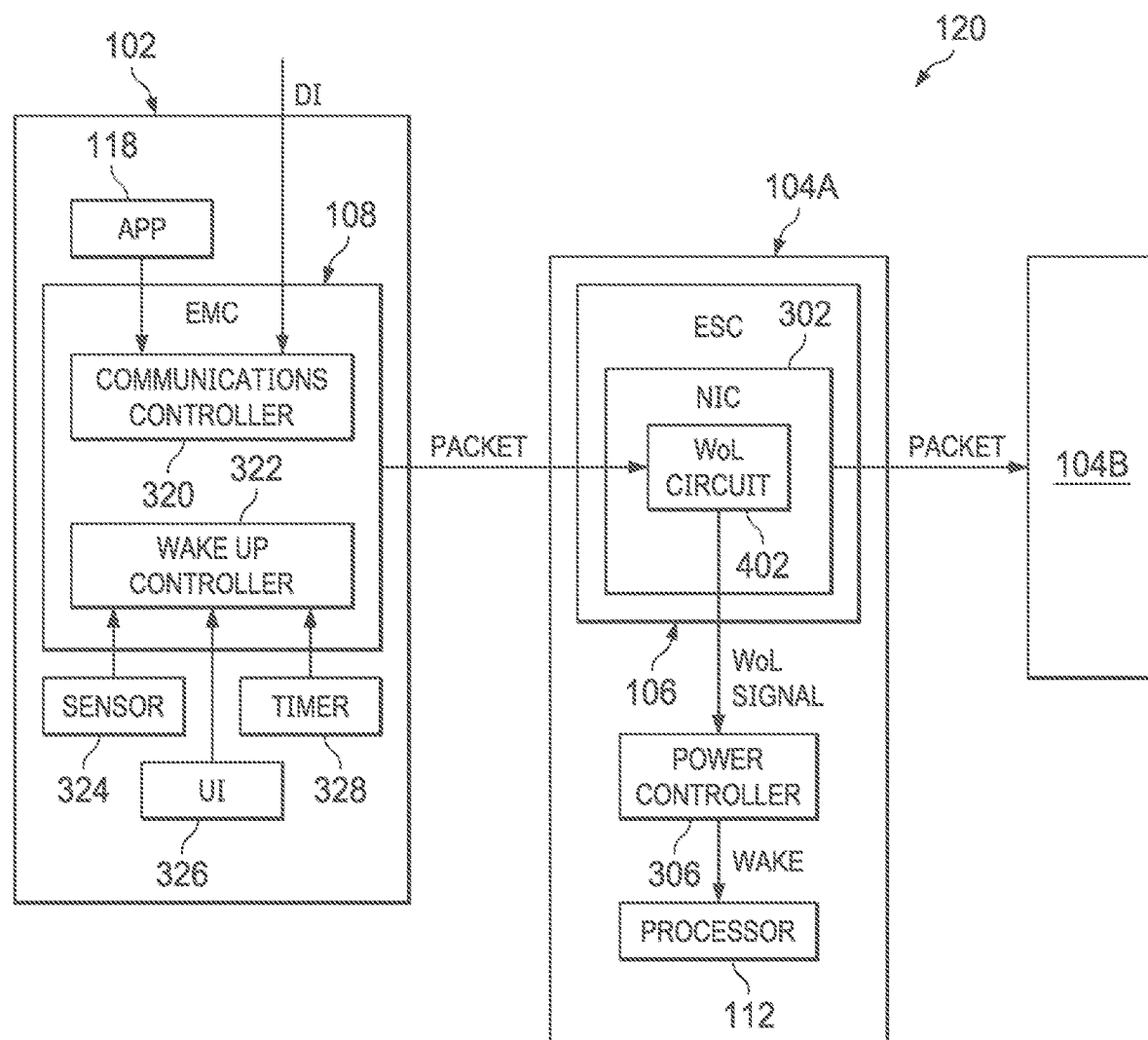
FIG. 4 is a more detailed illustration of the network, including portions of the slave node configured to wake-onlocal-area-network (WoL) in hardware, according to embodiments of the present disclosure.

FIG. 4 is a more detailed illustration of network 120, including portions of slave node 104 configured to wake-on-local-area-network (WoL) in hardware, according to embodiments of the present disclosure. In FIG. 4, master node 102 may be implemented in a similar manner as shown in FIG. 3. In FIG. 4, wakeup circuit 322 or communications circuit may issue a signal without a SleepFlag component. The signal may include a packet. The packet may be implemented within an EtherCAT frame.

In one embodiment, the packet may include a packet with a particular address. The packet, when received by slave node 104, may be recognized by slave node 104 as a wakeup packet based on the address. The address might not be specific to the particular instance of slave node 104, wherein after forwarding the packet to another instance of slave node, that other slave node may also recognize the address as indicating that the packet is a wakeup packet. Thus, the packet may be a wakeup packet for slave node 104 with an address that is not unique to slave node 104, or otherwise identifying an actual address used by slave node 104. The address may be, for example, the address of master node 102. The packet, when received by slave node 104, may be interpreted as a wakeup packet.

In another embodiment, the packet may include a WoL packet, which may be specifically configured to be recognized by WOL circuits. The WoL packet may include a magic packet. The magic packet may include a broadcast frame. The magic packet may include a particular sequence of values within a given portion of the frame. For example, the magic packet may include a value of 255 within its payload, followed by a specific number of repetitions of the target address, such as sixteen repetitions. The packet, when received by slave node 104, may be recognized as a WoL packet-based recognition of the particular sequence of values. The WOL packet may be configured to be a wakeup packet for slave node 104. The packet, when received by slave node 104, may be interpreted as a wakeup packet. Thus, NIC 302 may be configured to determine that the packet is a WoL packet by determining that the wakeup packet includes a predetermined value within a payload.

In yet another embodiment, the packet may be a broadcast packet such as a broadcast frame. The broadcast frame may be an EtherCAT frame. The packet, when received by slave node 104, may be recognized as a broadcast frame and interpreted as a wakeup packet for slave node 104 based upon its status as a broadcast frame. The packet, when received by slave node 104, may be interpreted as a wakeup packet. Thus, NIC 302 may be configured to determine that the packet is a WoL packet by determining that the wakeup packet is a broadcast packet.

In still yet another embodiment, the packet may be a frame, such as an EtherCAT frame, addressed to the specific instance of slave node 104 identified by the address of slave node 104. The packet, when received by slave node 104, may be interpreted as a wakeup packet. Thus, NIC 302 may be configured to determine that the packet is a WoL packet by determining that the wakeup packet includes an address of slave node 104.

In another embodiment, the packet may be a frame, such as an EtherCAT frame, addressed to the specific instance of slave node 104 identified by the address of another slave node 104 or of master node 102. The packet, when received by slave node 104, may be interpreted as a wakeup packet. Thus, NIC 302 may be configured to determine that the packet is a WoL packet by determining that the wakeup packet includes an address of another, particular EtherCAT device other than that of slave node 104. Specifically, the NIC 302 may be configured to determine that the packet is a WoL packet by determining that the wakeup packet includes an address of master node 102.

For any such wakeup packet, the recognition of the wakeup packet, alerting other portions of slave node 104, and forwarding the wakeup packet to other slave nodes may be handled in hardware. For example, these many be handled in NIC 302, and, in particular, a WoL circuit 402 within NIC 302. WOL circuit 402 may be implemented by any suitable combination of analog and digital circuitry. WOL circuit 402 may be configured to parse incoming packets while other portions of slave node 104, such as processor 112, are in a sleep mode. WOL circuit 402 may forward the received packets on to other nodes in the daisy chain. WOL circuit 402 may be configured to determine whether a given incoming packet is a WoL packet. Upon identifying an incoming packet as a wakeup packet, WoL circuit 402 may be configured to generate a wake signal, such as a WoL signal, to any other suitable portion of slave node 104 to initiate waking slave node 104 from the sleep mode. Such a wake signal may be sent to, for example, processor 112 or a power controller 306. NIC 302 may be configured to forward the packet on to another node in network 120.

For example, WoL circuit 402 may detect a wakeup packet. In response, WOL circuit 402 may issue a WoL signal to power controller 306. Power controller 306, upon receipt of the WoL signal, may boot up the remainder of slave node 104. This may include, for example, processor 112.

Figure 5:
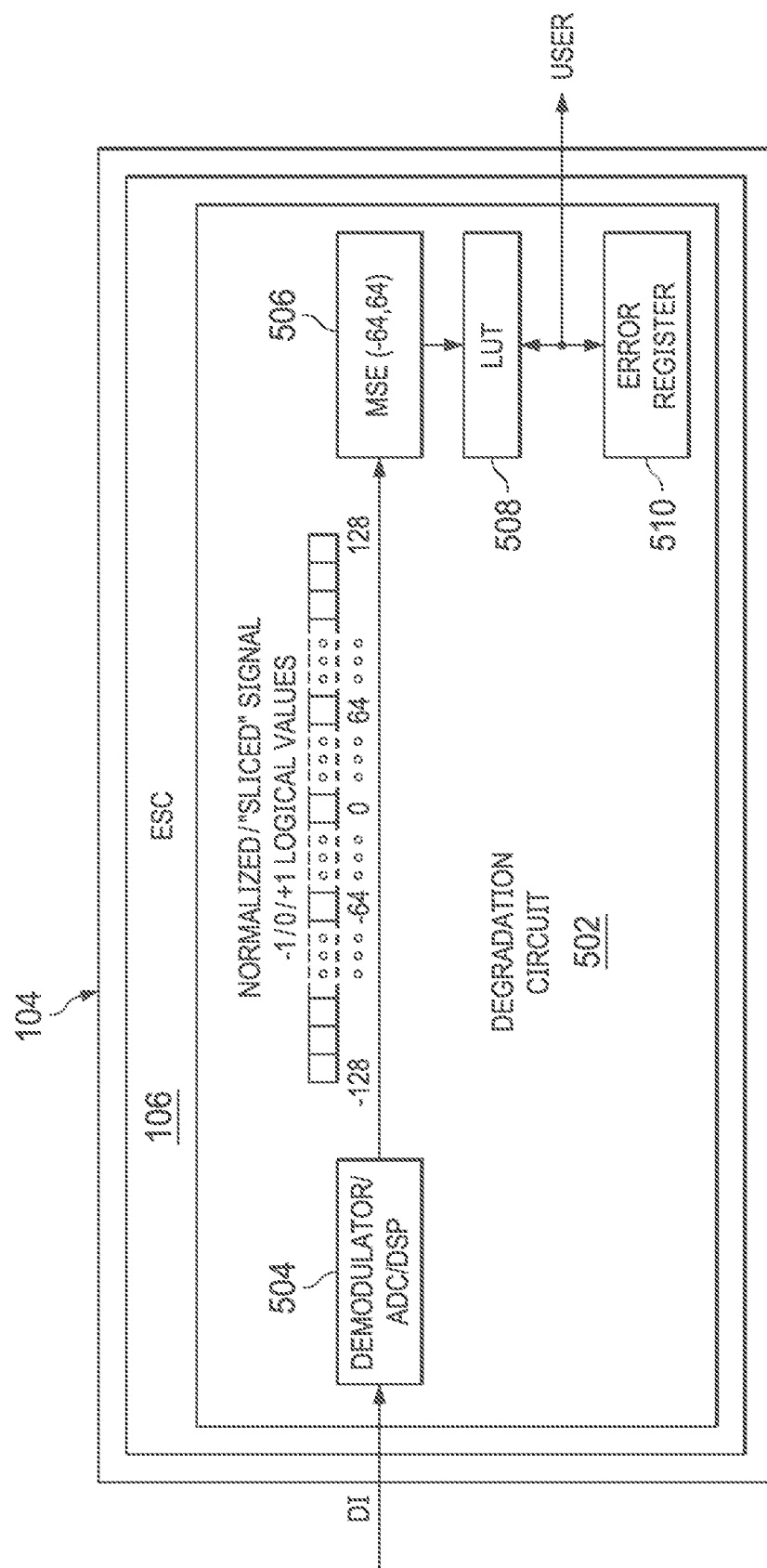
FIG. 5 is a more detailed illustration of a node, such as the master node and the slave nodes, including portions of the node to evaluate signal integrity, according to embodiments of the present disclosure.

FIG. 5 is a more detailed illustration of a node, such as master node 102 and slave nodes 104, including portions of the node to evaluate signal integrity, according to embodiments of the present disclosure. In the example of FIG. 5, a more detailed illustration of ESC 106 in slave node 104 is illustrated, including a degradation circuit 502. However, degradation circuit 502 may be also implemented in EMC 108 in master node 102. Degradation circuit 502 may be implemented by analog circuitry, digital circuitry, instructions for execution by a processor, or any suitable combination thereof.

Degradation circuit 502 may be configured to determine a signal strength of input channels, data, or lines on the DI port of slave node 104. Data input on the DI port may include one of any suitable different logical values. For example, the EtherCAT signals on the DI port may be of three different logic values: −1, 0, and +1. These three logical values may be actually transmitted in network 120 as any suitable voltages, such as −5V, 0V, and +5V. However, due to interference, component degradation, transmission line degradation, or any other source of error, the voltages at which the logical values are actually transmitted and received might not be −5V, 0V, and +5V, but values varying therefrom. Degradation circuit 502 may be configured to evaluate how much deviation has occurred between the ideal transmission voltage and the actual voltage received for these logical values.

Degradation circuit 502 may include a demodulator, analog to digital converter, and digital signal processor 504. Degradation circuit 502 may be configured to sample input from the DI port and produce a data set in which the input signal has been normalized across a given range, enumerated from, for example, −128 to 128. Each unit in the range may be referred to as a slice. The slices may be represented in an array. In this data set, an ideal −1 logical received value will be represented in the −128 slice, an ideal 0 logical received value will be represented in the 0 slice, and an ideal +1 logical received value will be represented in the 128 slice.

Degradation circuit 502 may be configured to determine how far a given input received through the DI and represented in the data slices is from expected values. This may be accomplished by evaluating the distance of the slice of the measurement from the −128 slice and the +128 slice. The −128 slice may represent an ideal measurement of a −1 logical value. The +128 slice may represent an ideal measurement of a +1 logical value. The 0 slice may represent an ideal measurement of a 0 logical value. Measurements that are represented by slices between −128 and −65 may be considered to be a −1 logical value. Measurements that are represented by slices between −64 and +64 may be considered to be a 0 logical value. Measurements that are represented by slices between +65 and +128 may be considered to be a +1 logical value. The −64 slice may represent a value at which a −1 logical value has sufficiently degraded to be considered a 0 logical value, or, conversely, a value at which a 0 logical value has sufficiently degraded to be considered a −1 logical value. The +64 slice may represent a value at which a +1 logical value has sufficiently degraded to be considered a 0 logical value, or, conversely, a value at which a 0 logical value has sufficiently degraded to be considered a +1 logical value. As a given received value has an unknown logical value, degradation circuit 502 may be configured to determine the intended logical value based on closeness to the ideal slices. As signals degrade and drift further from the −128 and +128 slices, degradation circuit 502 may be configured to identify such a condition before, for example, a +1 logical value degrades below the +64 slice, a 0 logical value degrades above the +64 slice or below the −64 slice, or a −1 logical value degrades above the −64 slice. Accordingly, degradation circuit 502 may be configured to determine a distance between of a position of a given slice (that is of the data input) and a position of a reference slice. The reference slices may include, for example, the −128 and +128 slices.

A −1 logical value may be detected if the slice of the measurement is less than or equal to 64 positions away from the −128 slice. Such positions may be evaluated in absolute terms. Ideally, the −1 logical value would be received in the −128 slice, wherein it is 64 positions away from the −64 slice. The actual distance between the slice of the measurement and the −128 slice may be a measure of the error of the −1 logical value transmission. Once a −1 logical value is equal or greater than the −64 slice, the data therein may be useless, as the logical value may undetermined or appear to be a logical 0 instead of a logical −1.

A 0 logical value may be detected if the slice of the measurement is greater than 64 positions from both the −128 and +128 slices. Ideally, the 0 logical value would be received in the 0 slice, wherein it is 128 positions away from the −128 slice and the +128 slice. The actual distance between the slice of the measurement and 0 may be a measure of the error of the 0 logical value transmission. Once a 0 logical value is equal or lesser than the −64 slice, or equal or greater than the +64 slice, the data therein may be useless, as the logical value may undetermined or appear to be a logical −1 or 1 instead of a logical 0.

A +1 logical value may be detected if the slice of the measurement is less than or equal to 64 positions from the +128 slice. Ideally, the +1 logical value would be received in the +128 slice, wherein it is 64 positions away from the +64 slice. The actual distance between the slice of the measurement and the +128 slice may be a measure of the error of the +1 logical value transmission. Once a +1 logical value is equal or less than the +64 slice, the data therein may be useless, as the logical value may undetermined or appear to be a logical 0 instead of a logical +1.

The error of the measured input data may be calculated and summed with other measurements by any suitable mechanism. For example, degradation circuit 502 may include a mean-squared-error (MSE) circuit 506. MSE circuit 506 may be implemented by analog circuitry, digital circuitry, instructions for execution by a processor, or any suitable combination thereof. MSE circuit 506 may be configured to measure the distances between the slice of the measured signal and the −128, 0, and +128 slices, determine the intended logical value (if not already known a priori), and calculate the errors represented by the distances. MSE circuit 506 may be configured to, for example, use a quantification of the distance between the slice of the measured signal and the −128, 0, and +128 slices as measured over a window of time, such as 500 microseconds. A mean-squared-error calculation may be performed. The determined error may be mapped to one of a set of discrete error conditions in a look-up table (LUT) 508. The result of the error mapped to LUT 508 may be stored in memory, such as in an error register 510, or provided to a user of system 120. Thus, degradation circuit 502 may be configured to determine an error based on the calculated distance.

The discrete error conditions defined in LUT 508 may describe relative degrees of error conditions, such as a condition with no errors, that logical −1 is out of an acceptable range, that logical 0 is out of an acceptable range, or that logical +1 is out on an acceptable range. The acceptable range may be, for example, between the position of the slice for the ideal logical value and a halfway point between the position of the slice for the ideal logical value and the −64 or +64 slice. For example, an acceptable range for logical −1 may be between the −128 slice and the −96 slice. If the measurement for logical −1 is greater than the −96 slice, approaching the −64 slice, then an error condition for logical −1 may be raised. An acceptable range for logical 0 may be between the −32 slice and the +32 slice. If the measurement for logical 0 is greater than the +32 slice or less than the −32 slice, then an error condition for logical 0 may be raised. An acceptable range for logical +1 may be between the +96 slice and the +128 slice. If the measurement for logical +1 is less than the +96 slice, then an error condition for logical +1 may be raised.

System 120 may use the error determined from LUT 508 in any suitable manner as an indicator of a signal quality index. The error itself may be used as the signal quality index, or the error translated into a qualitative measure of the signal quality index. Any suitable corrective action may be taken, such as reissuance of data or generating an alert to users.

Figure 6:
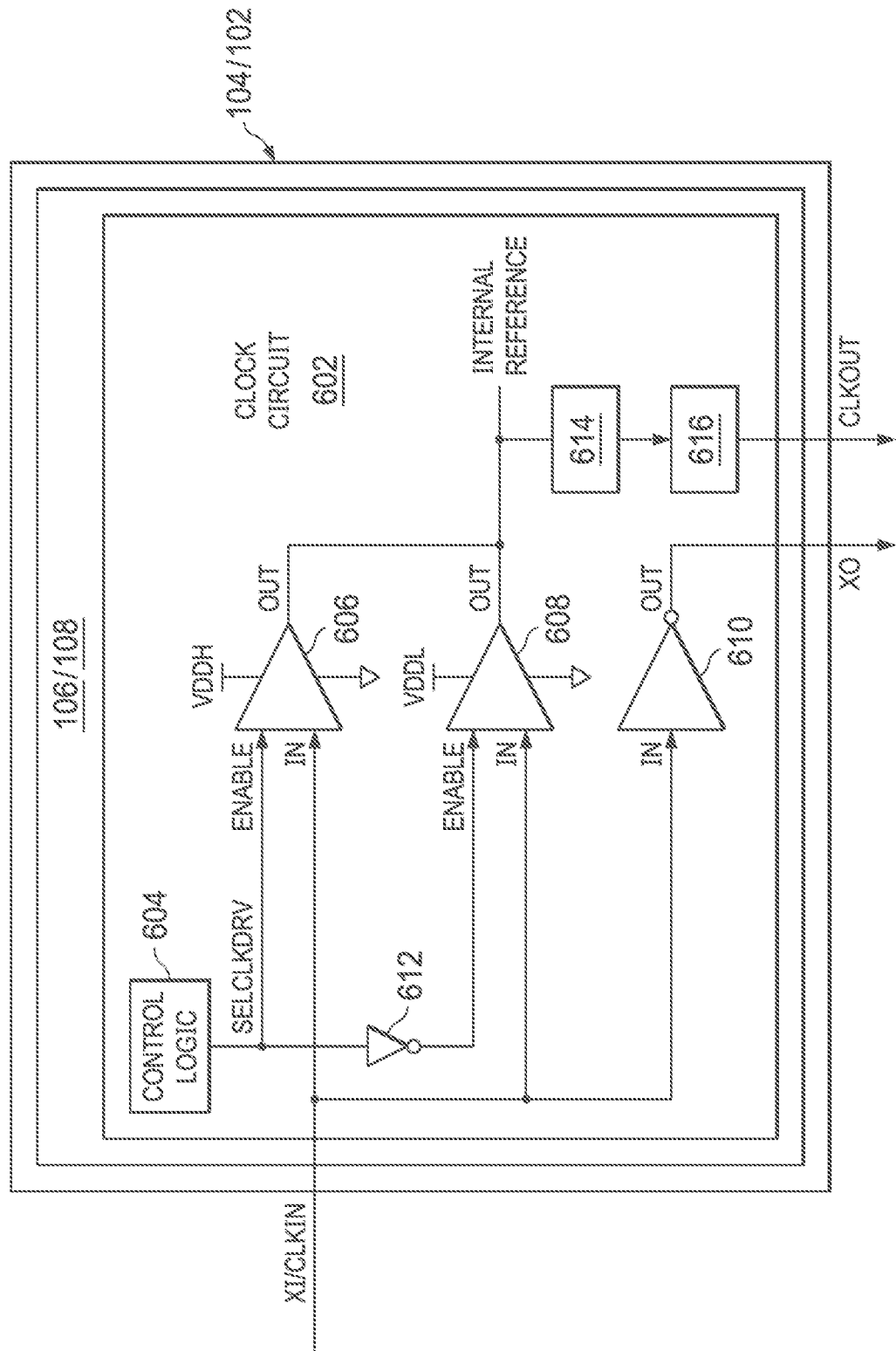
FIG. 6 is a more detailed illustration of a node, including portions of the node to operate selectively according to a clock signal generated by the node or according to a clock signal received from other nodes, according to embodiments of the present disclosure.

FIG. 6 is a more detailed illustration of a node, including portions of the node to operate selectively according to a clock signal generated by the node or according to a clock signal received from other nodes, according to embodiments of the present disclosure. FIG. 6 may provide a more detailed illustration of ESC 106 in slave node 104 or a more detailed illustration of EMC 108 in master node 102. Node 102/104 may include a clock circuit 602.

Clock circuit 602 may be configured to selectively determine whether the given node in which it is implemented is to use a clock signal generated by the node or a clock signal received at the node from another node in the daisy chain. Moreover, clock circuit 602 may be configured to route connections within the node to either use the clock signal generated by the node or the clock signal received at the node from another node in the daisy chain.

Clock circuit 602 may include a clock input such as XI/CLKIN configured to receive an input clock signal. Clock circuit 602 may include a clock output such as CLKOUT configured to send an output clock signal.

Clock circuit 602 may include control logic 604, which may be implemented by any suitable combination of analog circuitry, digital circuitry, and instructions for execution by a processor. Control logic 604 may determine settings of the node 102/104 to determine whether a clock signal generated by the node 102/104 or a clock signal received at the node 102/104 from another node in the daisy chain is to be used. Such a determination may be made in any suitable manner, such as a value in memory or a register. When the node 102/104 generates the clock signal, the node 102/104 may be said to be operating in a clock generation mode. The clock signal may be generated in any suitable manner, such as with an internal oscillator, an oscillator circuit, or a crystal oscillator (not shown) connected to the node 102/104. When the node 102/104 receives a clock signal from another node in the daisy chain, and utilizes that clock signal for operation of the node 102/104, the node 102/104 may be said to be operating in a clock propagation mode. Thus, control logic 604 may operate various elements of clock circuit 602 according to whether the node 102/104 is configured to operate in clock generation mode or in clock propagation mode.

In many expected applications of embodiments of the present disclosure, the clock signals internally used in clock circuit 602 may differ in voltage between clock generation mode or in clock propagation mode. For example, in clock generation mode, wherein clock circuit 602 is configured to generate a clock signal by, for example, applying an excitation voltage to external crystal 110 (not shown) and then receive a generated clock signal through XI/CLKIN, such a generated clock signal may be within a relatively low voltage range, such as 3.3 volts. In clock propagation mode, wherein clock circuit 602 is configured to propagate a received clock signal from another node to the rest of the daisy chain, the received clock signal may be within a relatively high voltage range, such as 5 volts.

Clock circuit 602 may include one or more clock regeneration circuits, which may be implemented in any suitable manner. Such clock regeneration circuits may be configured to receive the input clock signal and generate the output clock signal from the input clock signal. The output clock signal may, as a clock signal, alternate between voltage levels defined by clock circuit 602. Thus, given an input clock signal that is noisy, clock circuit 602 may be configured to regenerate the clock signal, with reduced noise, before it is passed on to subsequent nodes in network 120. Clock circuit 602 may include any suitable number of clock regeneration circuits. Clock circuit 602 may include different clock regeneration circuits according to different voltage domains that may need to be used in clock circuit 602. For example, the clock regeneration circuits of clock circuit 602 may include a VDDL buffer 608 and a VDDH buffer 606.

VDDL buffer 608 may be configured to issue a logic one value at a voltage equal to its voltage supply, VDDL, responsive to a positive signal on its input when it is enabled, and a logic zero value at, for example, a zero voltage when it is disabled or responsive to a low or negative signal on its input. VDDL buffer 608 may be used to process input clock signals from the XI/CLKIN input that are in a relatively low voltage range. Similarly, VDDH buffer 606 may be configured to issue a logic one value at a voltage equal to its voltage supply, VDDH, when it is enabled, and a logic zero value at, for example, a zero voltage when it is disabled or responsive to a low or negative signal on its input. VDDH buffer 606 may be used to process input clock signals from the XI/CLKIN input that are in a relatively high voltage range. Buffers 606, 608 may be enabled or disabled by a control signal from control logic 604. VDDL buffer 608 and a VDDH buffer 606 may each be connected to the CLKIN/XI input of the node. VDDL buffer 608 and a VDDH buffer 606 may each be configured to remove noise, jitter, or otherwise clean the clock signal that is either generated by the node through a crystal or received from another node through the CLKIN/XI input. VDDL buffer 608 and a VDDH buffer 606 may each be configured to do so by regenerating the clock signal.

In one embodiment, only one of VDDH buffer 606 and VDDL buffer 608 might be enabled at a time. Thus, the output clock signal of clock circuit 602 may be based on the output of whichever one of VDDH buffer 606 and VDDL buffer 608 that is enabled.

Output of buffers 606, 608 may be within a range defined by the power supplied to the respective buffers 606, 608. Accordingly, to standardize output levels of the output clock signal through CLKOUT to the next node in the daisy chain, clock circuit 602 may include one or more level translator circuits so that the output from whichever of respective buffers 606, 608 that is enabled may be standardized across both clock generation mode and clock propagation mode. For example, a level translator circuit 614 may receive the output of buffers 606, 608. Level translator circuit 614 may be configured to amplify its non-zero input to match a designated level. The designated level may be, for example, a voltage level to be used for the output clock signal. Furthermore, clock circuit 602 may include an output driver 616 configured to receive output of level translator circuit 614 and provide the output clock signal to CLKOUT. The output clock signal may thus alternate between voltage levels supplied to VDDH buffer 606 in the clock propagation mode, or between voltage levels supplied to VDDL buffer 608 in the clock generation mode, as processed by level translator circuit 614 to ensure that the output block signal is in an appropriate range and does not alternate between voltage levels.

Output of VDDH buffer 606 and VDDL buffer 608 may be used as an internal reference for use in clock circuit 602, or in general in slave node 104. The internal reference may be a clock signal. The internal reference may be taken from a node joining output of VDDH buffer 606 and VDDL buffer 608, or from output of level translator circuit 614 or output driver 616 (not shown).

Clock circuit 602 may include a crystal driver 610, implemented by, for example, an inverting operational amplifier. Crystal driver 610 may be enabled or disabled by a control signal (not shown) from control logic 604. Crystal driver 610 may be configured to receive input from the CLKIN/XI input and drive output to a crystal (not shown) connected to the XO output. Although referenced as a "crystal" driver, crystal driver 610 may include any suitable circuitry to drive operation of an oscillator to generate the input clock signal for clock circuit 602, as described below. Thus, crystal driver 610 may receive the input clock signal at its input. Furthermore, crystal driver 610 may thus be configured to provide a signal to an oscillator to drive the oscillator to generate the input clock signal.

In clock generation mode, control logic 604 may issue a control signal, SELCLKDRV, that is low. SELCLKDRV may disable VDDH buffer 606 and be passed through an inverter 612 to enable VDDL buffer 608. The voltage produced by crystal driver 610 may drive the crystal and generate a clock signal, which is then received on CLKIN/XI. This may be routed again to crystal driver 610, which may continue to drive the crystal to generate the clock signal. In parallel, VDDH buffer 606 may be disabled and thus provide no output. Furthermore, in parallel, VDDL buffer 608 may be enabled and thus reproducing the clock signal received therein from CLKIN/XI from the crystal. VDDL buffer 608 may reproduce the clock signal as values between VDDL and ground. The reproduced clock signal may be issued externally on the CLKOUT output and used internally within the node as necessary. Thus, clock circuit 602 may generate the input clock signal itself in cooperation with a crystal or oscillator.

In clock propagation mode, control logic 604 may issue a SELCLKDRV as a logic high signal. SELCLKDRV may enable VDDH buffer 606 and be passed through inverter 612 to disable VDDL buffer 608. A clock signal from another node may be received on CLKIN/XI. VDDL buffer 608 may be disabled and thus provide no output. Furthermore, VDDH buffer 606 may be enabled and thus regenerate the clock signal received therein from CLKIN/XI from the other node. VDDH buffer 606 may regenerate the clock signal as values between VDDH and ground. The regenerated clock signal may be issued externally, after level translation and driving by level translator circuit 614 and output driver 616, respectively, on the CLKOUT output and used internally within the node as necessary. Thus, clock circuit 602 may receive the input clock signal from another node in network 120.

In either mode, clock circuit 602 may be configured to provide the output of VDDH buffer 606 or VDDL buffer 608 as a reference for use within the node and to provide such an output as the output clock signal, after level translation and driving by level translator circuit 614 and output driver 616, respectively, to a subsequent node in network 120.

Figure 7:
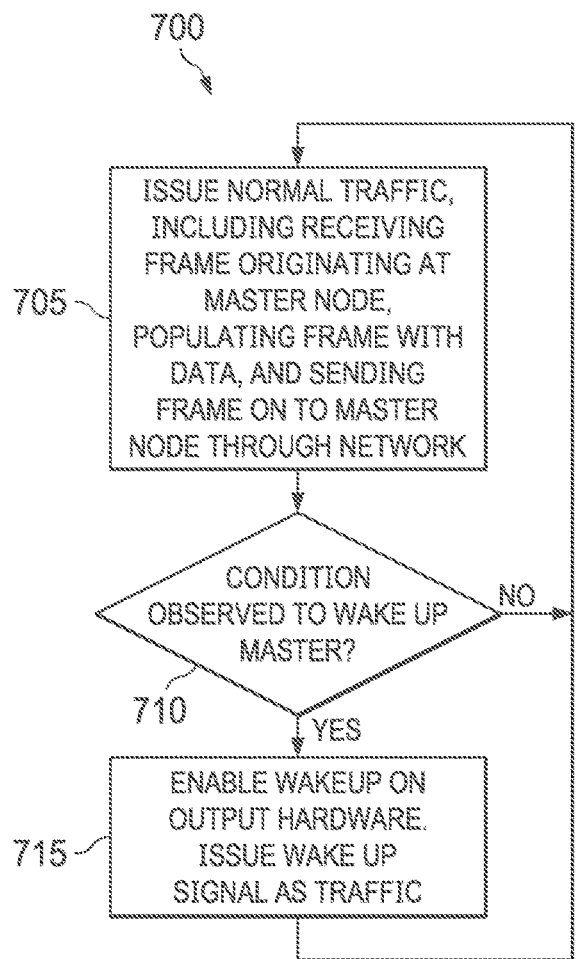
FIG. 7 is an illustration of a method for a slave node waking a master node, according to embodiments of the present disclosure.

FIG. 7 is an illustration of a method 700 for a slave node waking a master node, according to embodiments of the present disclosure. Method 700 may be performed by any suitable elements, such as those shown in FIG. 1-6. In particular, method 700 may be performed by instances of ESC 106. Method 700 may be performed in, for example, hardware, or by software. Method 700 may include fewer or more steps than shown in FIG. 7. Method 700 may begin at any suitable step, such as step 705. Method 700 may repeat steps, omit steps, perform steps in parallel, or perform steps recursively. Method 700 may optionally repeat or terminate.

At step 705, slave node 104 may issue normal traffic. Such normal traffic may include populating received EtherCAT frames for which data is requested, and propagating messages to other nodes.

At step 710, slave node 104 may observe or determine whether a condition for which master node 102 is to be woken. For example, slave node 104 may have data that is to be shared with master node 102 or other slave nodes 104. To send such data, slave node 104 might need to populate an EtherCAT frame, but master node 102 may be responsible for generating EtherCAT frames and may be in a sleep mode. Thus, at step 710, slave node 104 may determine whether a condition exists for which master node 102 is to be woken, and, if so, method 700 may proceed to step 715. Otherwise, method 700 may return to step 705.

At step 715, slave node 104 may enable wakeup signals on its output hardware. A wakeup signal may be issued as traffic. The wakeup signal may be sent to other slave nodes, eventually reaching master node 102. Slave node 104 may issue the wakeup signal because the sleep status of master 102 may be unknown to slave node 104. Method 700 may return to step 705.

Figure 8:
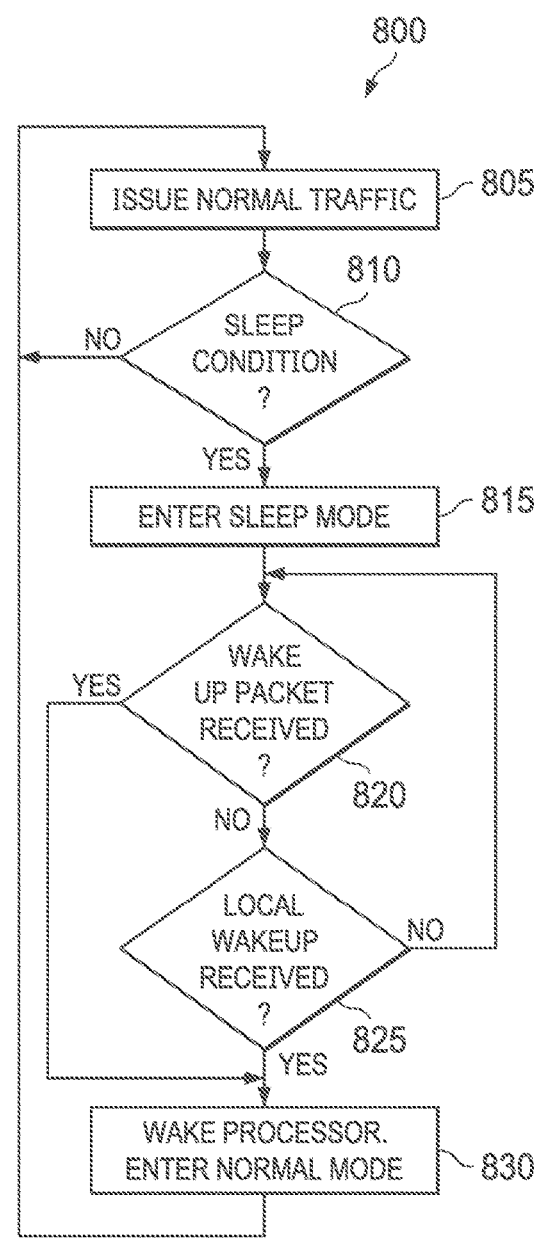
FIG. 8 is an illustration of a method for a master node being woken by a slave node, according to embodiments of the present disclosure.

FIG. 8 is an illustration of a method 800 for a master node being woken by a slave node, according to embodiments of the present disclosure.

Method 800 may be performed by any suitable elements, such as those shown in FIG. 1-6. In particular, method 800 may be performed by instances of EMC 108 in master node 102. Method 800 may be performed in, for example, hardware, or by software. Method 800 may include fewer or more steps than shown in FIG. 8. Method 800 may begin at any suitable step, such as step 805. Method 800 may repeat steps, omit steps, perform steps in parallel, or perform steps recursively. Method 800 may optionally repeat or terminate.

At step 805, master node 102 may issue normal traffic. At step 810, it may be determined whether master node 102 has encountered a sleep condition for itself alone or for network 120 generally. If so, method 800 may proceed to step 815, and otherwise method 800 may return to step 805.

At step 815, master node 102 may enter a sleep mode. Moreover, master node 102 may send a signal to slave nodes 104 to enter a sleep mode. The sleep mode may be partial, wherein slave nodes 104 observe for wake conditions, or conduct other operations while in sleep mode.

At step 820, it may be determined whether master node 102 has received a wakeup packet from one or more of slave nodes 104. If so, method 800 may proceed to step 830. Otherwise, method 800 may proceed to step 825.

At step 825, it may be determined whether master node 102 has itself observed a wakeup condition. If so, method 800 may proceed to step 830. Otherwise, method 800 may return to step 820.

At step 830, master node 102 may wake its processor and other portions therein. Master node 102 may issue a wakeup signal to slave nodes 104 and generate an EtherCAT frame. The EtherCAT frame may include the wakeup signal. Method 800 may return to step 805.

Figure 9:
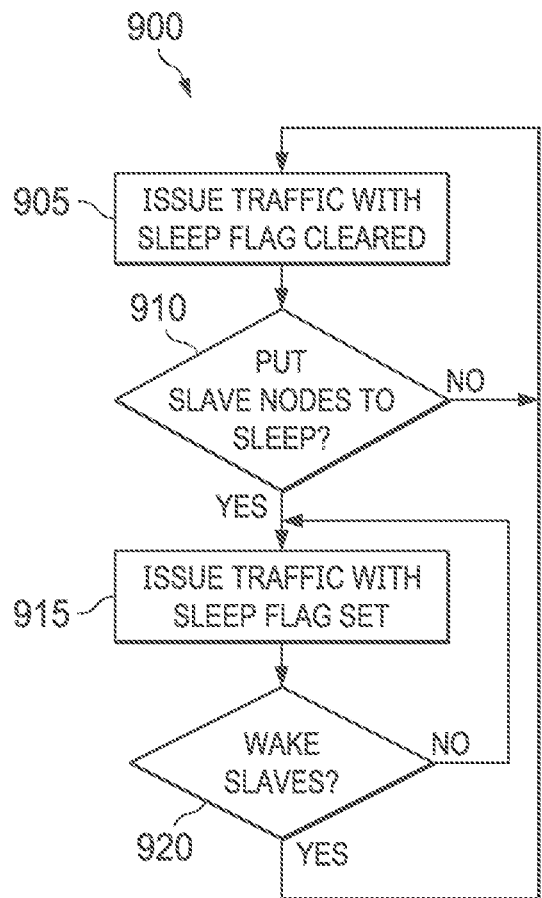
FIG. 9 is an illustration of a method for a master node waking a slave node using flags in network traffic, according to embodiments of the present disclosure.

FIG. 9 is an illustration of a method 900 for a master node waking a slave node using flags in network traffic, according to embodiments of the present disclosure.

Method 900 may be performed by any suitable elements, such as those shown in FIG. 1-6. In particular, method 900 may be performed by instances of EMC 108. Method 900 may be performed in, for example, hardware, or by software. Method 900 may include fewer or more steps than shown in FIG. 9. Method 900 may begin at any suitable step, such as step 905. Method 900 may repeat steps, omit steps, perform steps in parallel, or perform steps recursively. Method 900 may optionally repeat or terminate.

At step 905, master node 102 may issue traffic with a sleep flag cleared. The cleared sleep flag may instruct the recipients, slave nodes 104, to operate in a normal operating mode. At step 910, it may be determined whether a sleep condition has occurred, wherein slave nodes 104 are to operate in a sleep mode. If so, method 900 may proceed to step 915. Otherwise, method 900 may return to step 905.

At step 915, master node 102 may issue traffic include packets or signals with the sleep flag set. Reception of this traffic by slave nodes 104 may cause slave nodes 104 to be put into a sleep mode. Subsequent traffic, if any, will be issued with the same sleep flag set.

At step 920, it may be determined whether master node 102 is to wake slave nodes 104. If not, method 900 may return to step 915. Subsequent traffic with the sleep flag set might not be needed to be sent again during repetition of step 915. If master node 102 is to wake slave nodes, method 900 may return to step 905, wherein traffic with a cleared sleep flag may be issued.

Figure 10:
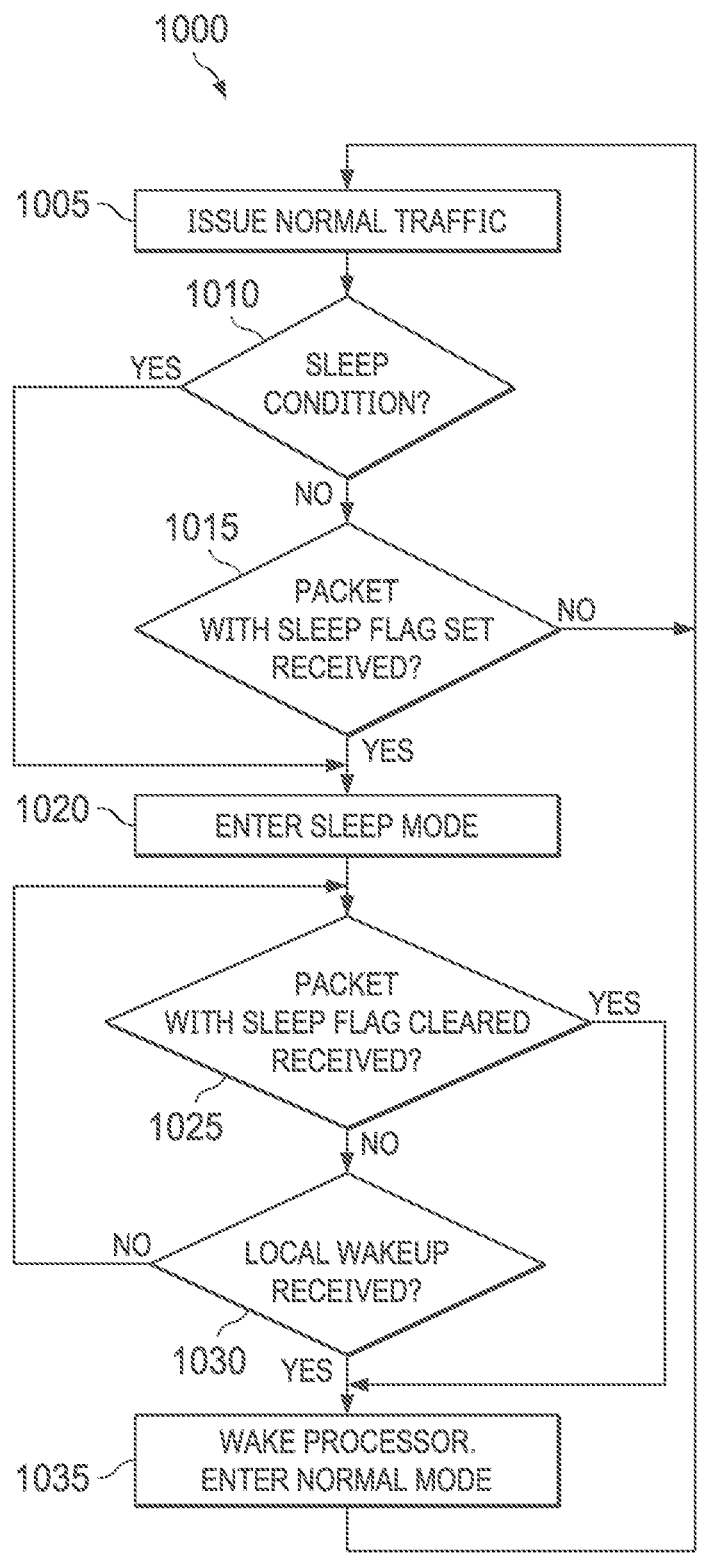
FIG. 10 is an illustration of a method for a slave node being woken by a master node using flags in network traffic, according to embodiments of the present disclosure.

FIG. 10 is an illustration of a method 1000 for a slave node being woken by a master node using flags in network traffic, according to embodiments of the present disclosure.

Method 1000 may be performed by any suitable elements, such as those shown in FIG. 1-6. In particular, method 1000 may be performed by instances of ESC 106 in slave node 104. Method 1000 may be performed in, for example, hardware, or by software. Method 1000 may include fewer or more steps than shown in FIG. 10. Method 1000 may begin at any suitable step, such as step 1005. Method 1000 may repeat steps, omit steps, perform steps in parallel, or perform steps recursively. Method 1000 may optionally repeat or terminate.

At step 1005, slave node 104 may issue traffic normally, responding to and forwarding EtherCAT packets. At step 1010, it may be determined whether slave node 104 is to enter a sleep mode. The determination may be made by observing input or conditions locally to slave node 104. If slave node 104 is to enter a sleep mode, method 1000 may proceed to step 1020. Otherwise, method 1000 may proceed to step 1015. At step 1015, it may be determined whether a packet with a sleep mode flag that is set has been received from another node, originating from master node 102. If so, method 1000 may proceed to step 1020. Otherwise, method 1000 may return to step 1005.

At step 1020, slave node 104 may enter a sleep mode. At step 1025, it may be determined whether traffic with a cleared sleep flag has been received. If so, method 1000 may proceed to step 1035. Otherwise, method 1000 may proceed to step 1030. At step 1030, it may be determined whether a local wakeup condition has been observed. If so, method 1000 may proceed to step 1035. Otherwise, method 1000 may return to step 1025.

At step 1035, slave node 104 may wake its processor and other components, and enter a normal operating mode. Method 1000 may return to step 1005.

Figure 11:
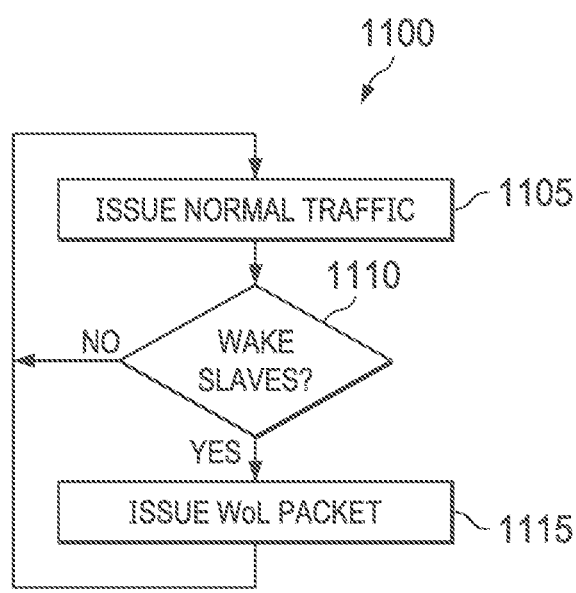
FIG. 11 is an illustration of a method for a master node waking a slave node using a WoL packet, according to embodiments of the present disclosure.

FIG. 11 is an illustration of a method 1100 for a master node waking a slave node using a WoL packet, according to embodiments of the present disclosure.

Method 1100 may be performed by any suitable elements, such as those shown in FIG. 1-6. In particular, method 1100 may be performed by instances of EMC 108 in master node 102. Method 1100 may be performed in, for example, hardware, or by software. Method 1100 may include fewer or more steps than shown in FIG. 11. Method 1100 may begin at any suitable step, such as step 1105. Method 1100 may repeat steps, omit steps, perform steps in parallel, or perform steps recursively. Method 1100 may optionally repeat or terminate.

At step 1105, master node 102 may issue normal traffic as needed to slave nodes 104. However, a long time may lapse between traffic such that slave nodes 104 may be in a sleep node. At step 1110, it may be determined whether slave nodes 104 are to be woken up. If so, method 1100 may proceed to step 1115. Otherwise, method 1100 may return to step 1105. At step 1115, a WoL packet may be issued to slave nodes 104. Method 1100 may return to step 1105.

FIGS. 12A-12F are illustrations of a method 1200 for a slave node being woken by a master node using a WoL packet, according to embodiments of the present disclosure.

Method 1200 may be performed by any suitable elements, such as those shown in FIG. 1-6. In particular, method 1200 may be performed by instances of ESC 106 in slave node 104. Method 1200 may be performed in, for example, hardware, or by software. Method 1200 may include fewer or more steps than shown in FIG. 12. Method 1200 may begin at any suitable step, such as step 1205. Method 1200 may repeat steps, omit steps, perform steps in parallel, or perform steps recursively. Method 1200 may optionally repeat or terminate.

Figure 12A:
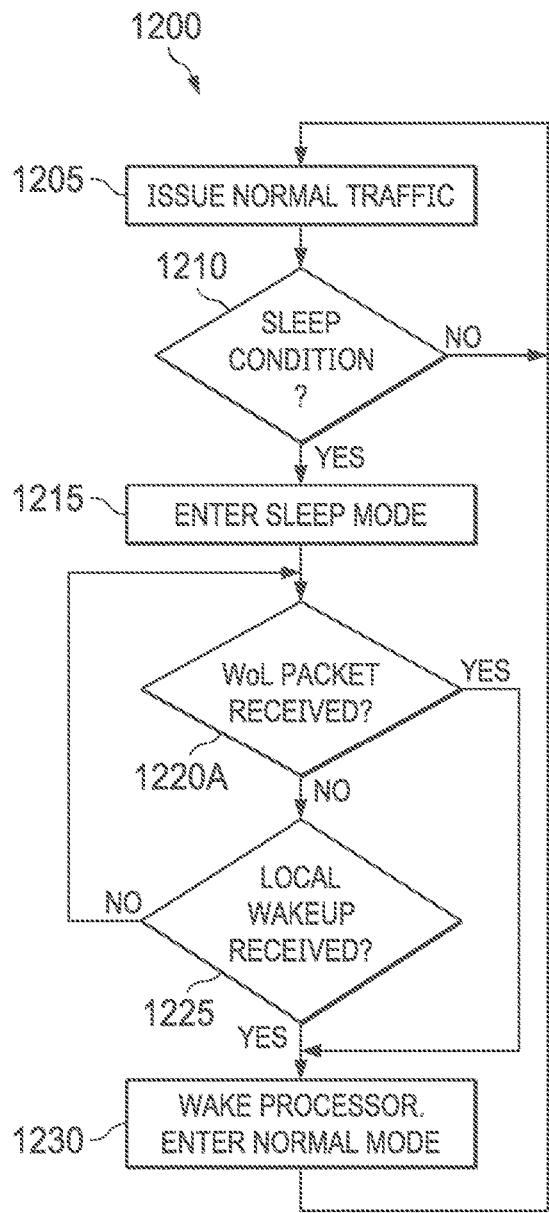
FIGS. 12A-12F are illustrations of a method for a slave node being woken by a master node using a WoL packet, according to embodiments of the present disclosure.
Figure 12B:
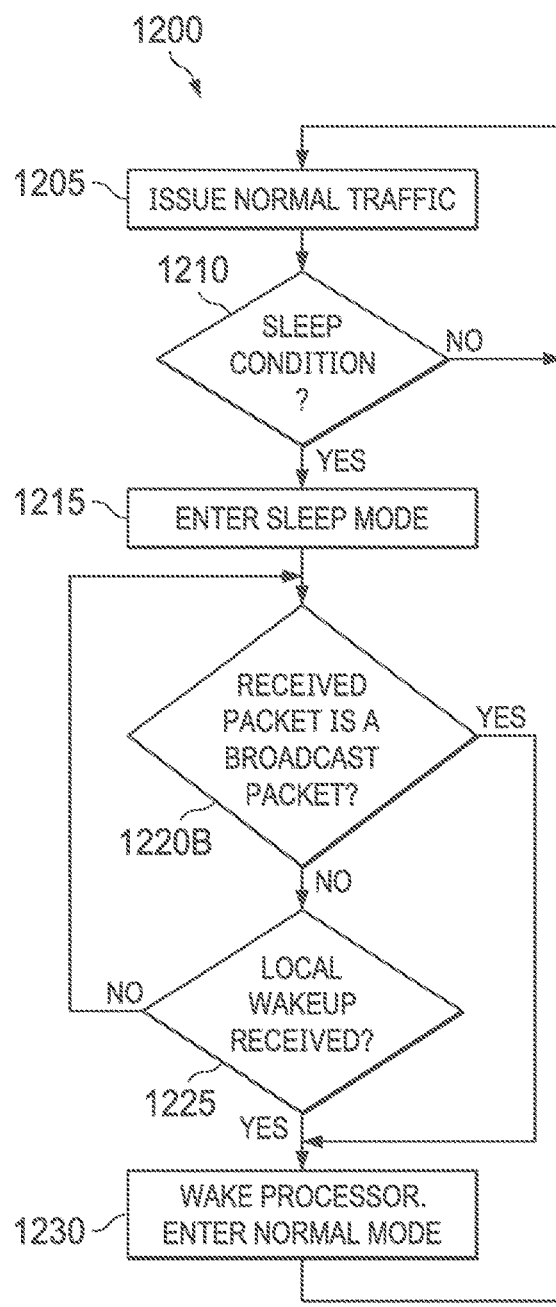

In FIG. 12A, at step 1205, slave node 104 may issue traffic normally. At step 1210, it may be determined whether slave node 104 is to enter a sleep mode. If so, method 1200 may proceed to step 1215, or otherwise return to step 1205.

Figure 12C:
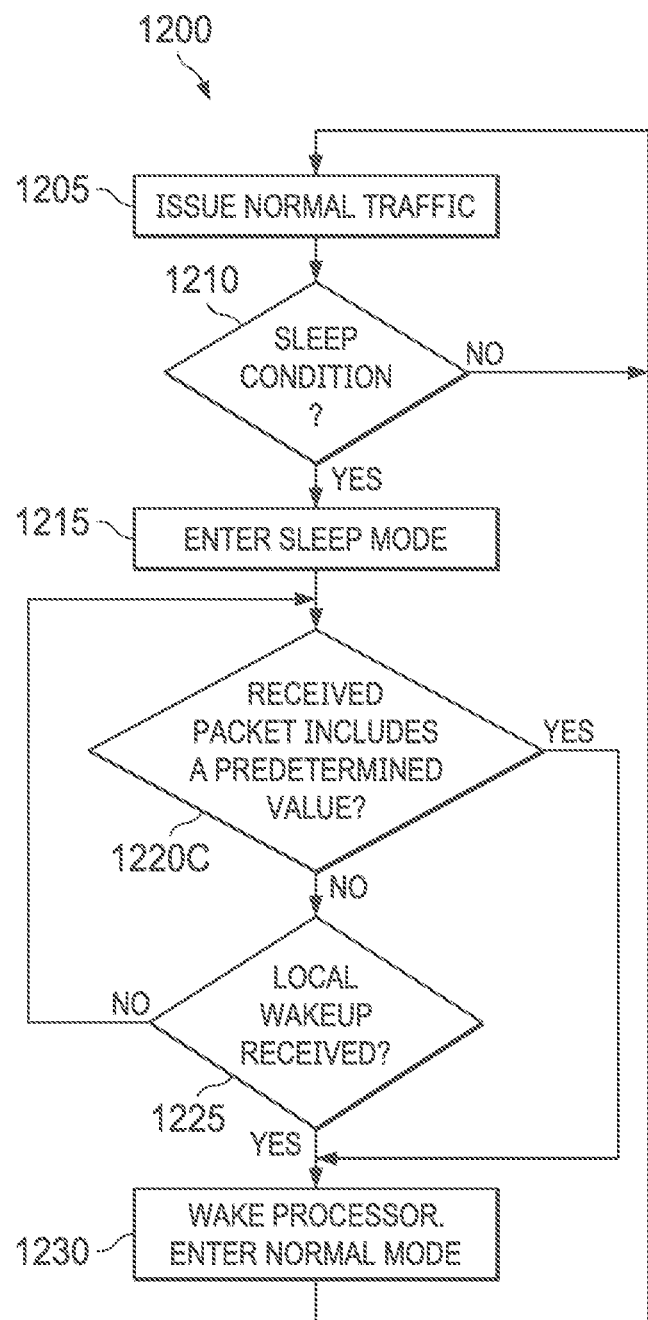
Figure 12D:
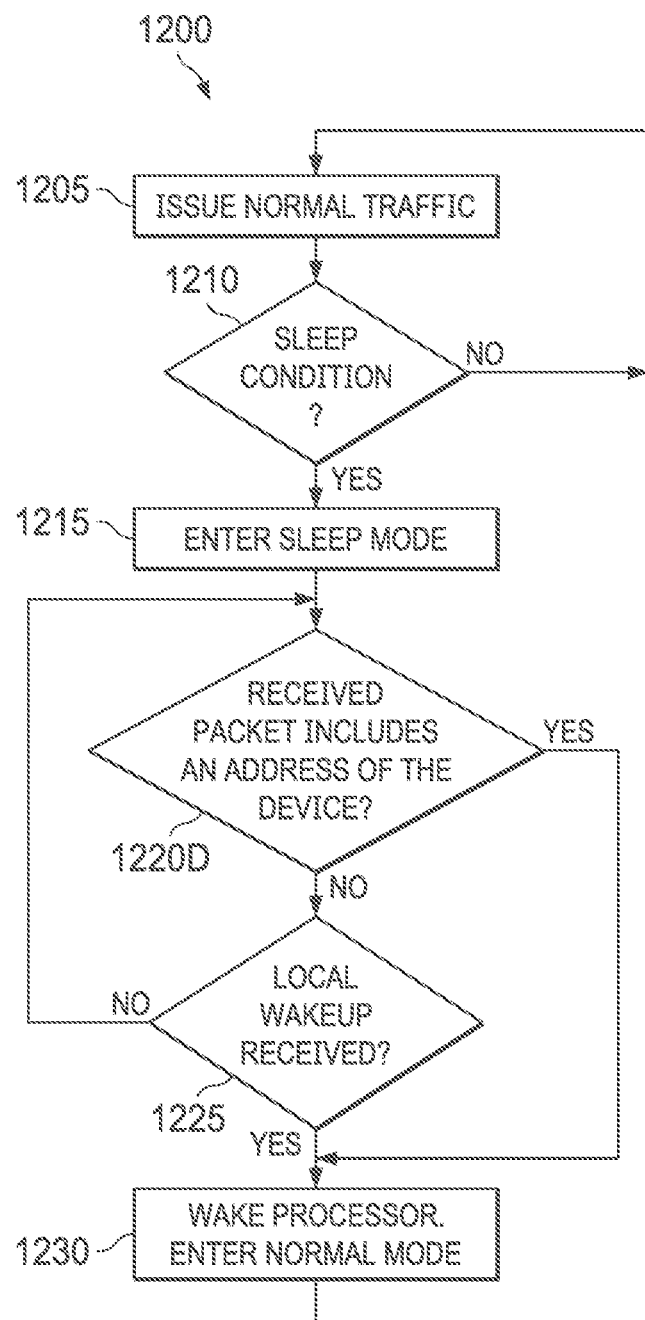
Figure 12E:
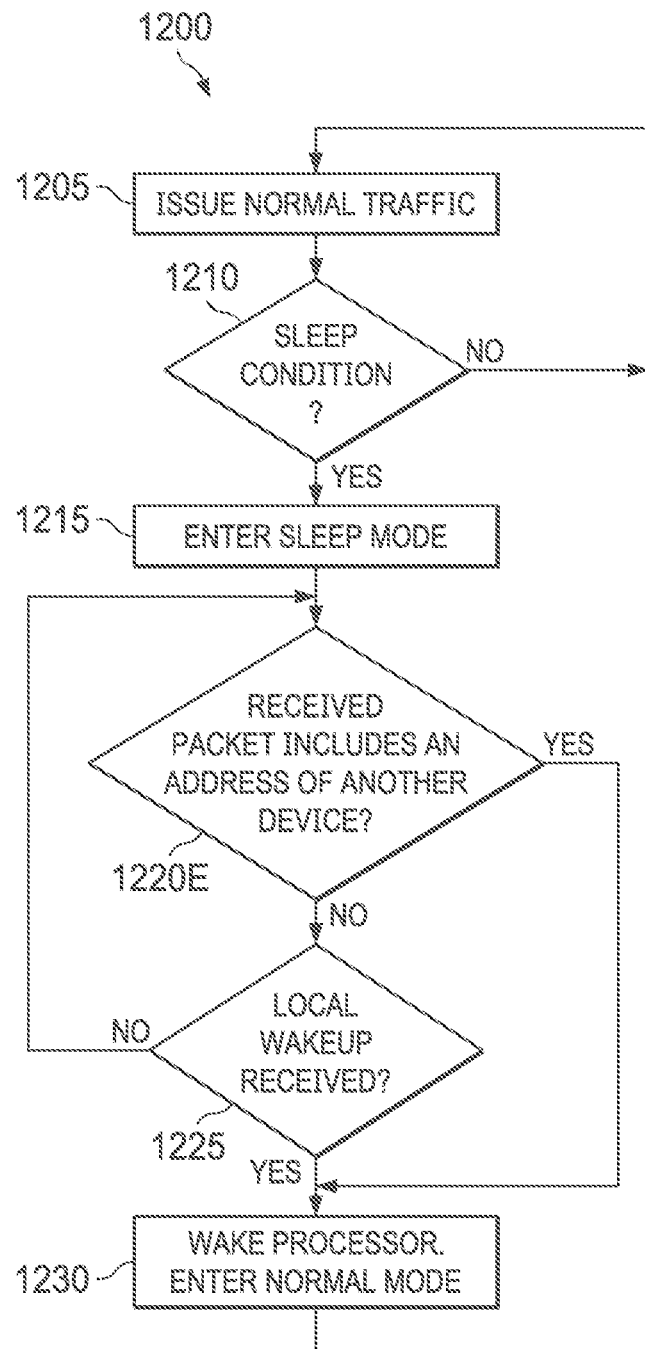
Figure 12F:
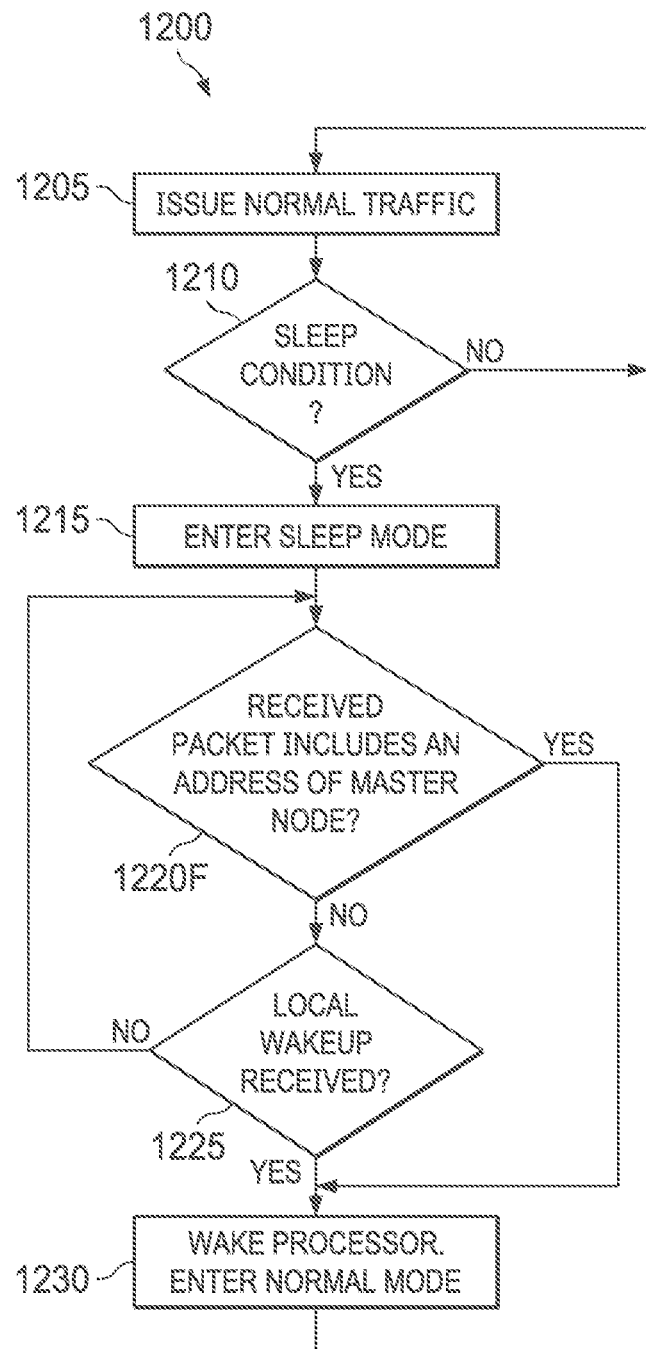

At step 1215, slave node 104 may enter the sleep mode. At step 1220A, it may be determined whether a WoL packet has arrived. Step 1220A may be implemented in any suitable manner. FIGS. 12B-12F illustrate example implementations of step 1220A within the context of the same steps otherwise performed by method 1200. For example, in FIG. 12B, in step 1220B, a WoL packet may be determined to have arrived if the received packet is a broadcast packet. In FIG. 12C, in step 1220C, a WoL packet may be determined to have arrived if the received packet includes a predetermined value. In FIG. 12D, in step 1220D, a WOL packet may be determined to have arrived if the received packet includes an address of the device. In FIG. 12E, in step 1220E, a WoL packet may be determined to have arrived if the received packet includes an address of another, different device. In FIG. 12F, in step 1220F, a WoL packet may be determined to have arrived if the received packet includes an address of a master node.

If a WoL packet has been determined to have arrived through any of steps 1220A-F, method 1200 may proceed to step 1230. Otherwise, method 1200 may proceed to step 1225. At step 1225, it may be determined whether a local wakeup condition has been observed at the slave node. If so, method 1200 may proceed to step 1230. Otherwise, method 1200 may return to step 1220.

At step 1230, the processor of slave node 104 may be woken up, along with other portions of slave node 104. A normal operating mode may be entered, and method 1200 may return to step 1205.

Figure 13:
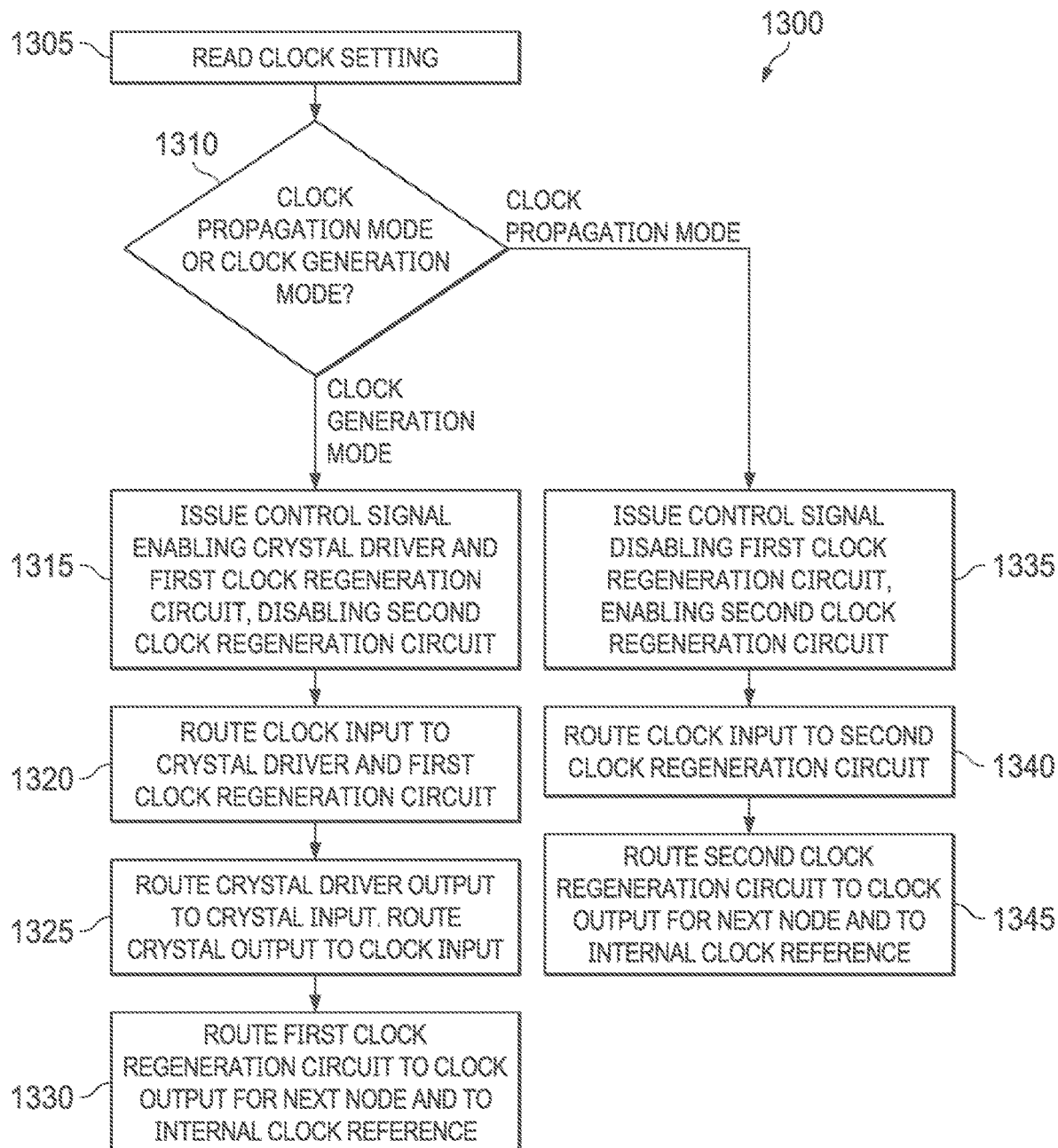
FIG. 13 is an illustration of a method for a node to perform clock signal daisy-chaining, according to embodiments of the present disclosure.

FIG. 13 is an illustration of a method 1300 for a node to perform clock signal daisy-chaining, according to embodiments of the present disclosure.

Method 1300 may be performed by any suitable elements, such as those shown in FIG. 1-6. In particular, method 1300 may be performed by instances of clock circuit 602 in ESC 106 or EMC 108 in slave node 104 or master node 102, respectively. Method 1300 may be performed in, for example, hardware, or by software. Method 1300 may include fewer or more steps than shown in FIG. 13. Method 1300 may begin at any suitable step, such as step 1305. Method 1300 may repeat steps, omit steps, perform steps in parallel, or perform steps recursively. Method 1300 may optionally repeat or terminate.

At step 1305, a clock setting for the node may be determined by, for example, reading a value from a register. The clock setting may determine whether a local oscillator, crystal, or other clock source is to be used, or whether a clock source is to be used from another node.

At step 1310, it may be determined, responsive to the determination of step 1305, whether the local crystal is to be used as the clock signal. If so, method 1300 may proceed to step 1315. Otherwise, method 1300 may proceed to step 1335.

At step 1315, a control signal may be issued that enables a crystal driver such as driver 610 and a first clock regeneration circuit such as VDDL buffer 608. The control signal may disable a second clock regeneration circuit such as VDDH buffer 606. The control signal may be issued by control logic 604. At step 1320, clock input for the node may be routed to the crystal driver 610 and to the first clock regeneration circuit. At step 1325, crystal driver output may be routed to input of the crystal. Crystal output may be routed to the clock input of the node. At step 1330, output of the first clock regeneration circuit may be routed to clock output for the next node in the daisy chain, as well as used as an internal clock reference for the node.

At step 1335, a control signal may be issued that disables the first clock regeneration circuit. The control signal may enable the second clock regeneration circuit. The control signal may be issued by control logic 604. At step 1340, clock input for the node may be routed second clock regeneration circuit. At step 1345, output of the second clock regeneration circuit may be routed to clock output for the next node in the daisy chain, as well as used as an internal clock reference for the node.

Figure 14:
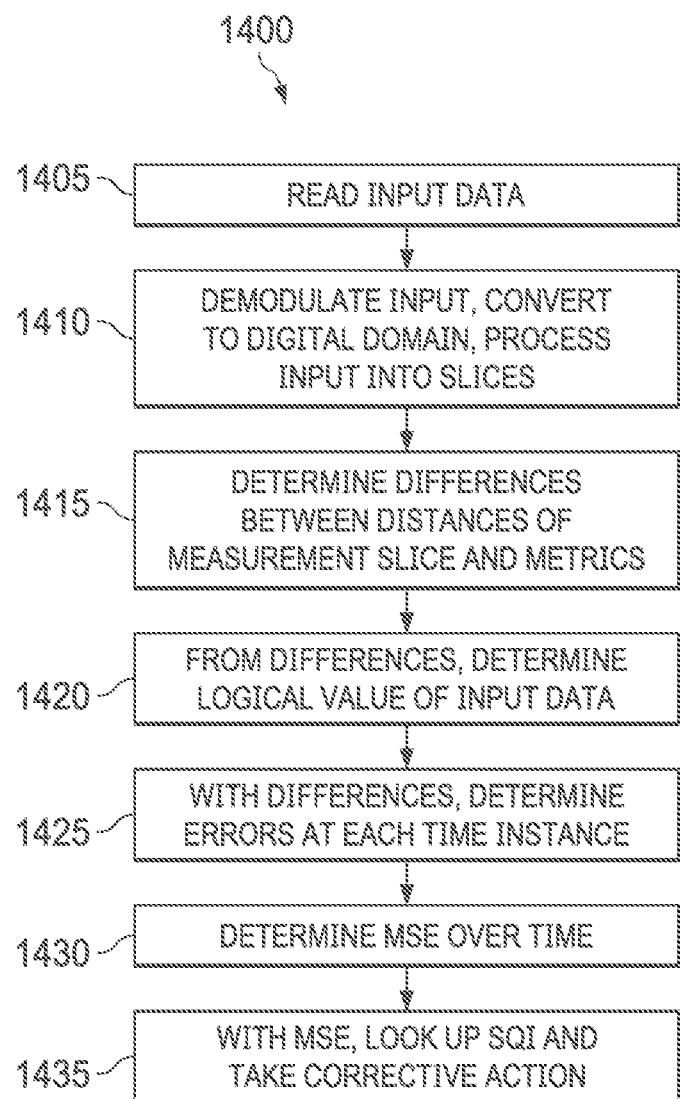
FIG. 14 is an illustration of a method for a node to perform evaluation of the quality of a received signal, according to embodiments of the present disclosure.

FIG. 14 is an illustration of a method 1400 for a node to perform evaluation of the quality of a received signal, according to embodiments of the present disclosure.

Method 1400 may be performed by any suitable elements, such as those shown in FIG. 1-6. In particular, method 1400 may be performed by instances of degradation circuit 502 in ESC 106 or EMC 108. Method 1400 may be performed in, for example, hardware, or by software. Method 1400 may include fewer or more steps than shown in FIG. 14. Method 1400 may begin at any suitable step, such as step 1405. Method 1400 may repeat steps, omit steps, perform steps in parallel, or perform steps recursively. Method 1400 may optionally repeat or terminate.

At step 1405, data input to the node may be read. The data may be of one of a plurality of logical values, such as −1, 0, and +1. At step 1410, the input may be demodulated, converted to a digital domain, and processed into slices, wherein the value of the input at each time instance may appear in one slice within the defined range of slices. At step 1415, differences between the slice of the input at each time instance and other reference slices may be determined. The reference slices may be, for example, a slice representing an ideal value corresponding to a logical value. At step 1420, the differences may be used to identify the intended logical value of the input data. At step 1425, those differences and intended logical values may be used to determine a quantification of error at a given time instance of the input. At step 1430, a mean-squared-error may be determined using the quantification of error at the given time instance in view of previous such quantifications of error for previous time instances. At step 1435, using the determined error, SQI characterizations of the data may be looked up in various ranges in a look-up table. Based upon the SQI characterizations, alerts or corrective action may be issued or taken if the quality of the received input data is sufficiently poor.

Although example embodiments have been described above, other variations and embodiments may be made from this disclosure without departing from the spirit and scope of these embodiments.

We claim:

1. An EtherCAT device for use as a node in an EtherCAT network, the EtherCAT device comprising:
a clock circuit;
a clock input to receive an input clock signal;
a clock output to send an output clock signal; and
control logic to:
determine whether to operate the EtherCAT device in a clock generation mode or a clock propagation mode, wherein:
in the clock generation mode, the clock circuit is to drive an oscillator to generate the input clock signal; and
in the clock propagation mode, the clock circuit is to receive the input clock signal from another node in the EtherCAT network, and
control the clock circuit to send the output clock signal at the clock output for a subsequent node in the EtherCAT network the output clock signal based upon the input clock signal.

2. The EtherCAT device of claim 1, wherein the clock circuit includes at least one clock regeneration circuit to receive the input clock signal and generate the output clock signal from the input clock signal, the output clock signal to alternate between a first voltage level and a second voltage level supplied to the at least one clock regeneration circuit.

3. The EtherCAT device of claim 1, wherein:
the clock circuit includes a first clock regeneration circuit to receive the input clock signal and generate a first output;
the clock circuit includes a second clock regeneration circuit to receive the input clock signal and generate a second output; and
the control logic is to output the output clock signal at the clock output based on the first output of the first clock regeneration circuit or the second output of the second clock regeneration circuit based upon whether the EtherCAT device is in the clock generation mode or clock propagation mode.

4. The EtherCAT device of claim 1, wherein:
the clock circuit includes a crystal driver to, in the clock generation mode, provide a signal to the oscillator to drive the oscillator to generate the input clock signal; and
the clock circuit, in the clock generation mode, is to route the input clock signal to an input of the crystal driver.

5. A method, comprising:
receiving, through a clock input, an input clock signal;
sending, through a clock output, an output clock signal;
outputting the output clock signal for a subsequent node in an EtherCAT network based upon the input clock signal; and
determining whether to operate an EtherCAT device in the EtherCAT network in a clock generation mode or a clock propagation node, wherein:
in the clock generation mode, the method includes driving an oscillator to generate the input clock signal; and
in the clock propagation mode, the method includes receiving the input clock signal from another node in the EtherCAT network.

* * * * *